(12) United States Patent
Molinaro et al.

(10) Patent No.: US 9,109,938 B2
(45) Date of Patent: Aug. 18, 2015

(54) LEVEL SENSOR AND ASSOCIATED CONTROL CIRCUIT, IN PARTICULAR FOR A FILTER FOR VEHICLES

(75) Inventors: Marco Molinaro, Alessandria (IT); Mauro Zorzetto, Casale Monferrato (IT); Paolo Colombo, Alessandria (IT)

(73) Assignee: ELTEK S.P.A., Casale Monferrato (IT)

( * ) Notice: Subject to any disclaimer, the term of this patent is extended or adjusted under 35 U.S.C. 154(b) by 482 days.

(21) Appl. No.: 13/322,411

(22) PCT Filed: May 25, 2010

(86) PCT No.: PCT/IB2010/052301
§ 371 (c)(1),
(2), (4) Date: Dec. 16, 2011

(87) PCT Pub. No.: WO2010/136959
PCT Pub. Date: Dec. 2, 2010

(65) Prior Publication Data
US 2012/0073366 A1    Mar. 29, 2012

(30) Foreign Application Priority Data

May 26, 2009 (IT) .............................. TO2009A0399

(51) Int. Cl.
*G01F 23/24* (2006.01)
(52) U.S. Cl.
CPC ............ *G01F 23/244* (2013.01); *G01F 23/242* (2013.01)
(58) Field of Classification Search
CPC ....... G01F 23/00; G01F 23/24; G01F 23/284; G01F 23/242; G01F 23/26; G01F 23/0076; G01F 23/0069; G01F 23/0061; G01F 23/261; G01F 25/0076

USPC .................... 73/290 R, 304 R, 304 C; 702/55
See application file for complete search history.

(56) References Cited

U.S. PATENT DOCUMENTS 3,668,630 A    6/1972    Radin et al.
3,978,463 A    8/1976    Kerscher, III
(Continued)

FOREIGN PATENT DOCUMENTS

CN    1595075 A    6/2005
CN    101257956 A    9/2008
(Continued)

OTHER PUBLICATIONS

Written Opinion issued in Application No. PCT/IB2010/052301 on Oct. 11, 2010.
(Continued)

*Primary Examiner* — Hezron E Williams
*Assistant Examiner* — Marrit Eyassu
(74) *Attorney, Agent, or Firm* — Workman Nydegger

(57) ABSTRACT

A sensing device includes at least one electrode pair (2, 3, 4) and one sensing circuit (140) connected to the electrode pair (2, 3, 4). The sensing circuit (140) switches the value of its own output voltage when a substance establishes contact across the electrodes (2, 3, 4). The device further includes one output circuit (180) connected to the output of the sensing circuit (140) and adapted to provide an output signal (s7) representative of the presence of a substance across the electrode pair (2, 3, 4). The device also allows the output signal to take different voltage and/or current and/or frequency values, in particular such that values can be discerned which are representative of the presence or level of substances and/or representative of faults of the device.

23 Claims, 13 Drawing Sheets

(56) References Cited

U.S. PATENT DOCUMENTS

| | | | |
|---|---|---|---|
| 4,265,262 A * | 5/1981 | Hotine | 137/2 |
| 4,276,161 A | 6/1981 | Matsui et al. | |
| 4,638,305 A * | 1/1987 | Sutton | 340/620 |
| 5,719,556 A | 2/1998 | Albin et al. | |
| 5,777,550 A | 7/1998 | Maltby et al. | |
| 6,763,713 B2 | 7/2004 | Kim et al. | |
| 8,330,603 B1 * | 12/2012 | Gibb | 340/618 |
| 2002/0175822 A1 | 11/2002 | Merwin | |
| 2003/0205085 A1 * | 11/2003 | Arias | 73/290 R |
| 2006/0021432 A1 | 2/2006 | Salzmann et al. | |
| 2006/0070956 A1 | 4/2006 | Herrmann et al. | |
| 2007/0068249 A1 * | 3/2007 | Eguchi et al. | 73/304 R |
| 2007/0204690 A1 * | 9/2007 | Salzmann et al. | 73/304 R |
| 2008/0189058 A1 * | 8/2008 | Merwin et al. | 702/55 |
| 2010/0094468 A1 * | 4/2010 | Sahu et al. | 700/281 |
| 2010/0154534 A1 * | 6/2010 | Hampton | 73/304 C |
| 2010/0224161 A1 | 9/2010 | Kolezyk et al. | |
| 2012/0006111 A1 * | 1/2012 | Burdi et al. | 73/304 R |

FOREIGN PATENT DOCUMENTS

| | | | |
|---|---|---|---|
| EP | 1 314 968 | 5/2003 | |
| EP | 1314968 A1 * | 5/2003 | G01F 25/00 |
| EP | 1 811 274 | 7/2007 | |

OTHER PUBLICATIONS

International Search Report issued in Application No. PCT/IB2010/052301 on Oct. 11, 2010.

* cited by examiner

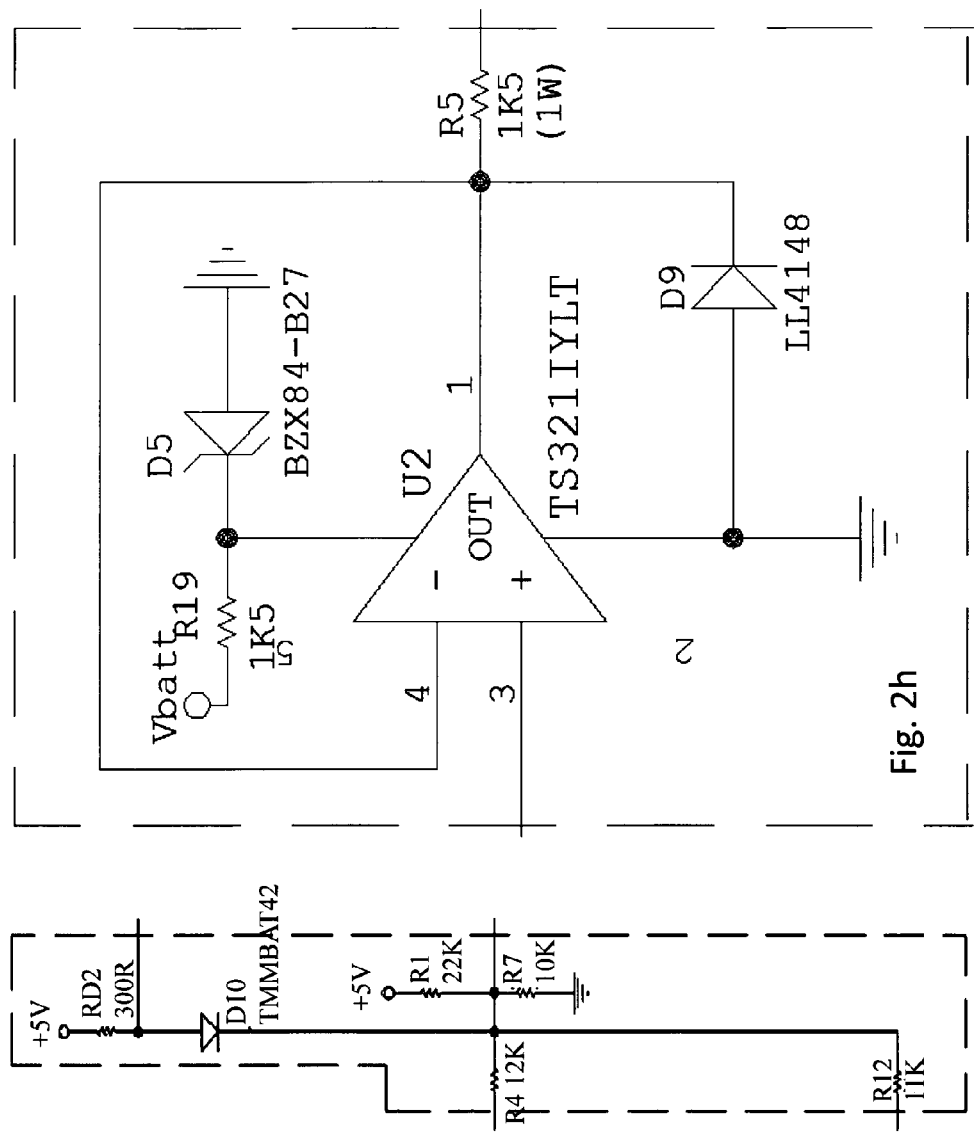

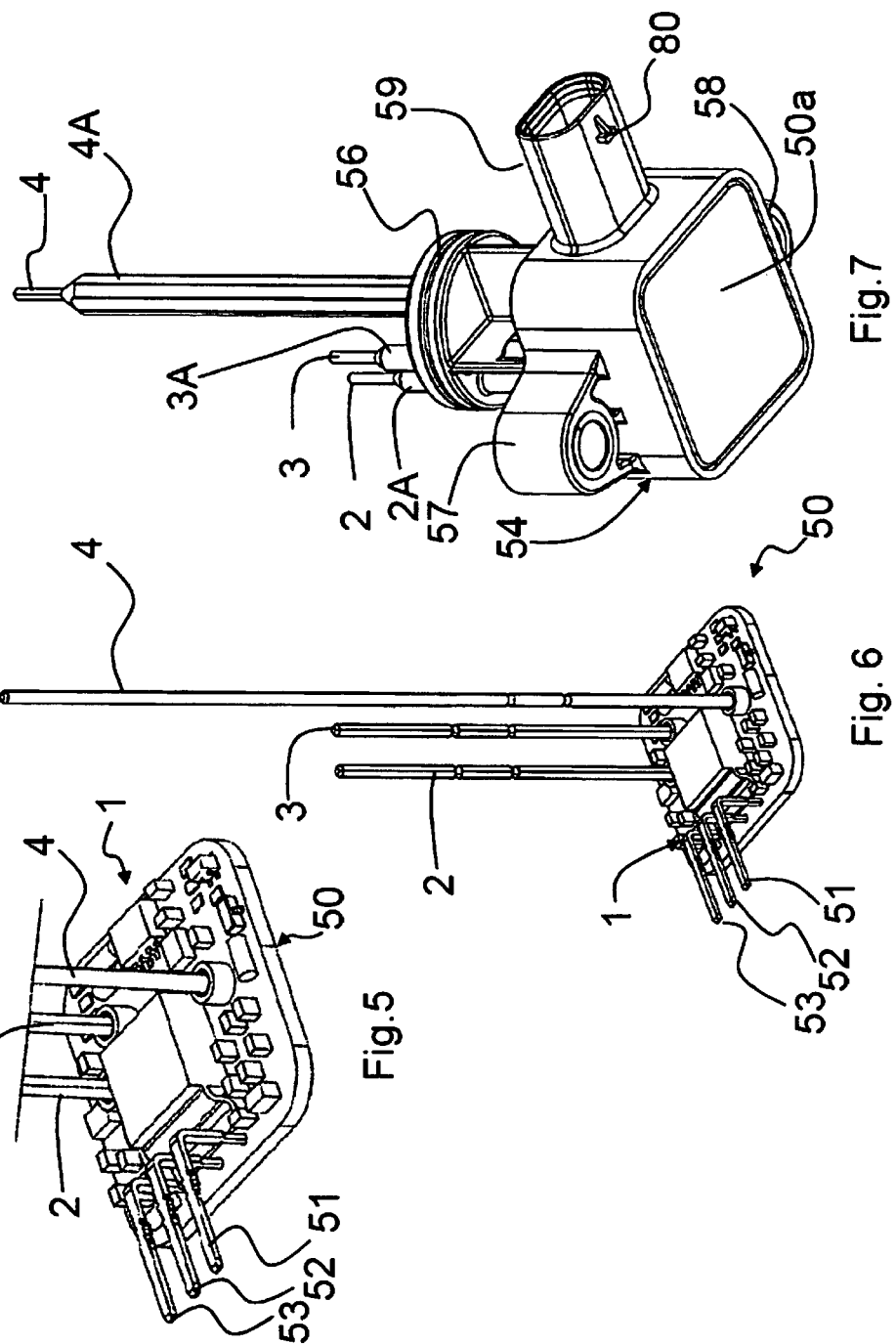

LEVEL SENSOR AND ASSOCIATED CONTROL CIRCUIT, IN PARTICULAR FOR A FILTER FOR VEHICLES

BACKGROUND OF THE INVENTION

1. Field of the Invention

The present invention relates to a sensing device as well as to a related sensing method.

In particular, the invention relates to at least one level sensor, i.e. a device and/or an electronic circuit adapted to detect the presence and/or level of a substance, e.g. a fluid preferably of the electrically conducting kind, in particular at a certain height above a reference surface, such as the detection of a conducting liquid at a certain height in a container used for collecting it.

2. Present State of the Art

The invention preferably and advantageously applies to filters for vehicles, in particular to fuel filters.

Several devices for sensing the presence or level of substances are known in the art, which operate on the basis of different physical principles.

Some of these devices utilize an electrode pair and detect the presence of the substance based on the variation in the electric resistance across the electrodes.

For instance, patent U.S. Pat. No. 4,276,161 discloses a fuel filter fitted with a level sensor capable of sensing the level of water collected in a chamber of the filter itself. In this solution, an electrode is connected to the input of a comparator and its free end is immersed into the water collection chamber. When the water level reaches the electrode, the water establishes an electric connection between the filter body (which acts as an electrode and ground terminal) and the electrode, thus causing the comparator output to change and allowing the presence of the liquid to be detected.

However, this solution suffers from the drawback that the electrodes will degrade prematurely due to the fact that the direct voltage applied across the electrodes gives rise to electrochemical phenomena, such as erosion phenomena, when the electrodes are immersed into the water.

As an alternative to direct voltages, according to a known solution the electrodes are supplied with an alternating voltage generated by an oscillator supplied with a direct voltage, like that provided by a vehicle's battery. A similar solution is known from U.S. Pat. No. 3,978,463, which discloses a level indicator for vehicles which detects the absence of fuel in a tank.

In patent U.S. Pat. No. 3,978,463, the oscillator's alternating signal is applied directly to a switch, consisting of a transistor, which changes its state depending on the presence or absence of fuel. In this patent, the oscillator's alternating signal is applied directly to a switch, consisting of a transistor, which changes its state depending on the presence or absence of fuel. In this case as well, it may happen that direct voltages are present across the electrodes, e.g. because of electrostatic discharges which are detrimental to electrodes.

In both solutions known from U.S. Pat. Nos. 4,276,161 and 3,978,463, one electrode consists of the very container which collects the conducting liquid and which is used for providing the electric ground connection. This container is usually connected to other components of the vehicle, which are adapted to support and secure it. Therefore, with these solutions there is a risk of anomalous electric ground contacts, e.g. with the creation of anomalous electric resistances, also called "parasitic resistances", in series with the electric power circuit; this phenomenon, also referred to as "ground offset", may lead to wrong readings, e.g. due to anomalous electric voltages added to the voltage corresponding to the actual measured level. This phenomenon may also be found in other cases, as in an electric wire harness including electric connectors with oxidized contacts.

The aforementioned types of sensing devices, in particular level sensors for vehicular filters, are typically associated with electric or electronic circuits having a very simple structure, e.g. a lamp that goes on when water is detected within a fuel filter (U.S. Pat. No. 4,276,161), or they may be associated with rather complex electronic circuits, such as electronic circuits with a microprocessor or a microcontroller capable of controlling actuators, e.g. valves or pumps, as a function of the signal detected by the sensor. For example, US2006/0070956 discloses a level sensor connected to a microprocessor that drives an electromagnetic pump in order to drain the water collection container of the fuel filter when it receives the maximum level signal from the sensor.

Patent U.S. Pat. No. 6,763,713 discloses that a vehicle's control unit may be suitably programmed for detecting a fault in the fuel level sensor. This detection is possible by cross-referencing the data obtained from the level sensor with other information received from other different sensors.

The known types of detectors, in particular level sensors, more in particular for filters for vehicles, include very simple circuits that, although quite inexpensive, cannot carry out complex functions or are associated with relatively sophisticated circuits, which are however more expensive.

SUMMARY OF THE INVENTION

The object of the present invention is to overcome the above-mentioned drawbacks.

In particular, it is an object of the present invention to define a sensing device, in particular a level sensor, which allows to implement sensor state control and/or signalling functions without requiring the use of complex and costly systems.

In particular, it is an object of the invention to provide a level sensor and/or an electronic circuit thereof which allow to detect and signal an operating fault, such as an anomalous electric voltage or an excessively low power supply or a locked condition.

It is another object of the invention to provide a sensor, in particular a level sensor, which is reliable and economical.

It is a further object of the invention to carry out a level detection while avoiding or reducing any risks of corrosion or damage to the sensor's electrodes, in particular due to the electric current or voltage applied across them.

The invention also aims at improving detection accuracy, in particular by avoiding or reducing the risk of wrong readings, in particular due to anomalous electric contacts, e.g. anomalous electric ground contacts.

It is yet another object to define a method for controlling a level sensor which does not require any complex operations, such as a comparison with signals from other sensors, in order to detect an operating fault in the sensor.

These objects are achieved through a circuit, an associated sensing device (in particular a level sensor) and a sensing method incorporating the features set out in the appended claims, which are intended as an integral part of the present description.

One of the ideas at the basis of the present invention is to provide means such that the output signal of the sensing device changes over time, in particular so as to discern voltage and/or current and/or frequency values representative of the presence or level of substances across the electrodes and/or values representative of faults in the device.

In particular, the sensing device is fitted with a control module connected to the circuit output and to a component to be monitored.

The control module detects any operating faults in said monitored component and controls the circuit output.

The output is controlled in a manner such that the signal contained therein takes voltage values such as to discern values representative of the presence of a substance across the electrodes from values representative of faults in said monitored components.

In particular, the output is controlled in a manner such that the signal contained therein takes voltage values such as to discern values representative of the presence across the electrodes of a substance having predetermined characteristics (e.g. electric resistance o dielectric constant greater than predefined values) from values representative of faults in said monitored component.

For example, in the case of a vehicle's fuel filter, fuel is normally present across the electrodes and the goal is to detect the presence of water filtered by the filter. The substance to be detected, i.e. water in this case, has electric conductivity characteristics which are different from those of fuel; in particular, it has less electric resistance than fuel.

In particular, in the absence of any faults, the output is controlled in a manner such as to determine an alternating electric signal, such as an alternating voltage signal; in particular, the output is controlled in a manner such as to alternate reading intervals, in which it is possible to get a signal representative of the detection made by the circuit, with synchronization intervals, in which the output is brought to a voltage value different from those taken during the detection; preferably, said control or state mode is such as to allow an external unit, e.g. a microprocessor, to verify the correct operation of the circuit, in particular based on the alternating levels of the output signal.

In the event of a fault, the output is kept fixed to a value, preferably different from those taken during the reading interval when the device is operating normally, such as an output with a signal having a continuous electric voltage value, i.e. a signal lacking said alternating intervals or states.

Preferably, the output is kept set to a voltage value which depends on the fault type.

In a particularly advantageous embodiment, in addition to signalling a fault by appropriately varying the output signal, the sensing circuit can also eliminate the fault by restarting the circuit or at least a part thereof, in particular that component where the fault was found.

This prevents the device from staying inoperative or keeping on operating erratically, e.g. due to external noise or other factors, thereby ensuring an automatic resumption of normal operation; for example, as is the case when there is noise or low voltage on the electric power line, due to a vehicle's discharged battery.

For example, if the battery is dead or anyway does not supply power to the sensor, the latter will get into a faulty condition as signalled by the circuit, but as soon as the battery is restored the sensor will be reset automatically. This may occur, for example, when the engine is started, since the battery may suffer temporary voltage drops.

Advantageously, the sensing circuit comprises an oscillator adapted to allow the electrodes to be energized by means of an alternating voltage electric signal. In this way, if the electrodes are immersed into a conducting liquid, an alternating current flow will reduce the damage suffered by the electrodes, e.g. caused by electrochemical phenomena.

For the purpose of reducing electrode damage even further, the electrodes are preferably connected to the oscillator and to the other circuit components through decoupling devices, e.g. capacitors arranged in series with the line that connects the electrodes to the various components, so as to prevent any direct voltages from being generated across the electrodes.

In a preferred solution, the sensing circuit is used for a level sensor of a filter to be installed in a vehicle, preferably for a fuel filter.

In this case, both electrodes are advantageously placed into the filter container and one of them is connected to the common ground of the circuit, the term "ground" referring herein to an electric power supply terminal, such as a connection to the negative potential of the vehicle's battery and/or to the vehicle's metal structure; this solution will reduce "ground offset" problems.

Advantageously, said problem is further attenuated by the presence of decoupling capacitors, which prevent any direct voltages from being generated across the electrodes.

Production costs can advantageously be reduced by manufacturing the sensing device, in particular a level sensor, by prevalently using discrete components.

Further advantageous features will be set out in the appended claims, which are intended as an integral part of the present description.

BRIEF DESCRIPTION OF THE DRAWINGS

These features as well as further advantages of the present invention will become apparent from the following description of an embodiment thereof as shown in the annexed drawings, which are supplied by way of non-limiting example, wherein:

FIG. 2b is a detailed view of block 110 of FIG. 2a;

FIG. 2c is a detailed view of block 120 of FIG. 2a;

FIG. 2d is a detailed view of block 140 of FIG. 2a;

FIG. 2e is a detailed view of block 160 of FIG. 2a;

FIG. 2f is a detailed view of block 180 of FIG. 2a;

FIG. 2g is a detailed view of block 180a of FIG. 2a;

FIG. 2h is a detailed view of block 180b of FIG. 2a;

FIGS. 3a-3c show equivalent schematic circuits of an output module of the circuit of FIG. 2a;

FIGS. 4a-4d show the output signal of the circuit of FIG. 2a;

FIGS. 5-7 show an example of a device and/or a circuit according to the invention;

DETAILED DESCRIPTION OF THE PREFERRED EMBODIMENTS

Figure 1:
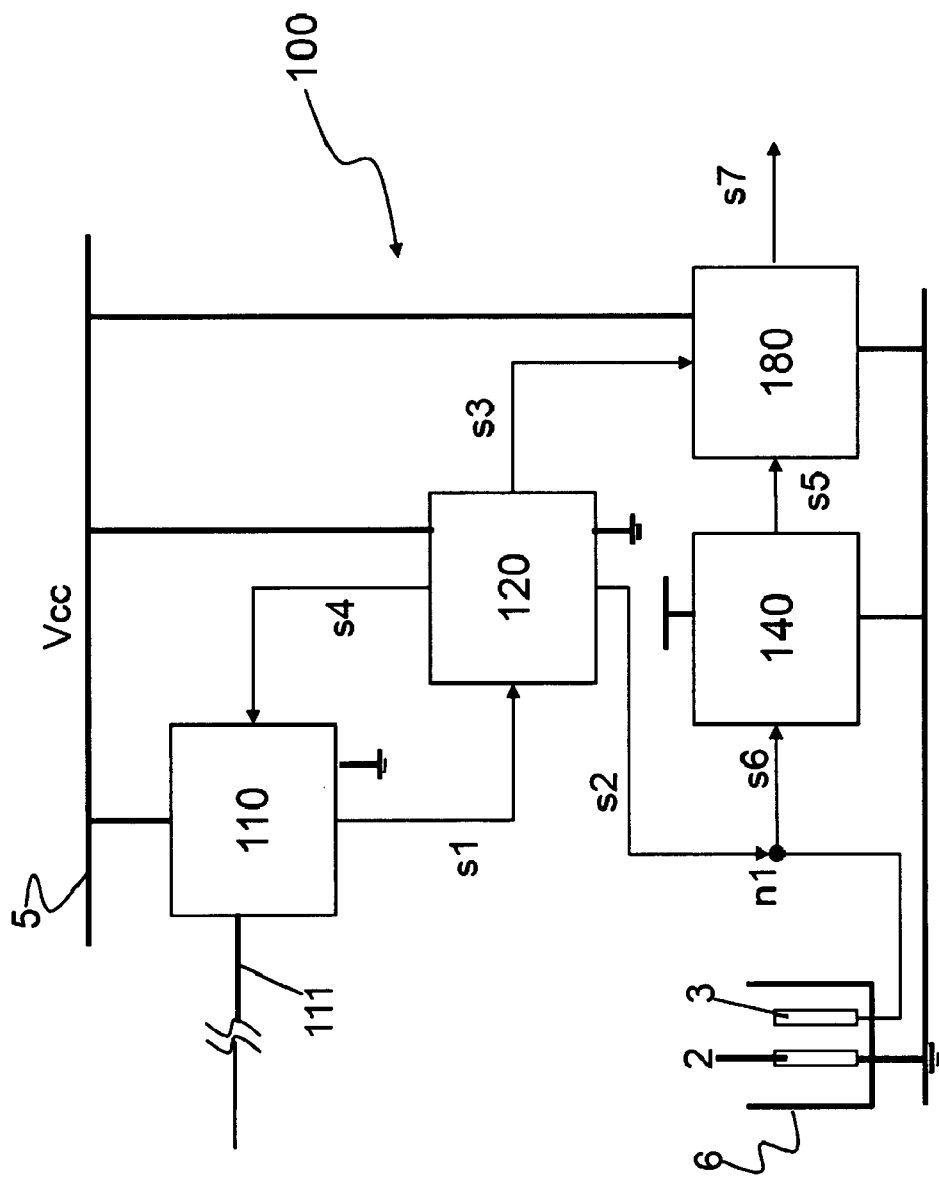
FIG. 1 is a block diagram of a circuit according to a first embodiment of the present invention.

The diagram of FIG. 1 refers to an electronic sensing and/or control circuit 100 for a sensing device, in particular of the type that detects the presence of a substance.

In the following description, the term "substance" will refer to any fluid or solid material, such as liquids, powders or granular solids.

Unless otherwise specified, the term "signal" will refer to an electric voltage and/or current signal.

Preferably, the circuit 100 of FIG. 1 is of the type that detects the presence of a conducting material depending on the impedance (whether resistive, capacitive or inductive) across an electrode pair.

In the preferred embodiment, which will be described below with reference to FIG. 1, the sensing device is a level sensor 1 of the type fitted with an electrode pair 2, 3 used for detecting a level of a substance, in particular a liquid, contained in a container 6.

Preferably, in a preferred but non-limiting embodiment the sensing device is of the type adapted to detect a level of a conducting liquid, such as the water collected in a collection chamber of a fuel filter.

In the block diagram of FIG. 1, reference numeral 110 designates an electric power module of the electronic circuit; said power module outputs a direct voltage Vcc which is made available to the other modules through a power line 5.

The power module 110 may comprise an internal voltage generator, such as a battery, or it may receive a voltage from an external generator, such as the battery of a vehicle, through a line 111.

In this case, the module 110 may behave as a voltage regulator and/or stabilizer by regulating and/or stabilizing the input voltage in order to supply the desired direct voltage Vcc to the circuit.

In the preferred example of FIG. 1, the power circuit 110 is also adapted to generate at least one reset signal s1 for restarting other circuit components, in particular the test module 120 which, as will be explained hereafter, may also include control functions, thus becoming a test and/or control module 120.

Said reset signal s1 may even be independent from said module 110, i.e. the circuit 100 may comprise an independent reset module.

The test and/or control module 120 is adapted to generate at least one test signal s2 for sensing the substance across the electrodes and in particular, for example, the level of a liquid in a container 6.

The test signal s2 is transmitted over a line afferent to the input node n1 of the module 140, to which the electrode 3 is afferent as well; since the electrode 2 is connected to a common ground line of the whole circuit, the test signal s2 causes a voltage drop across the electrode pair 2, 3.

In an embodiment, along the line from the module 120 to the node n1 there are means (e.g. a resistor) for changing the amplitude of the test signal s2, in particular so as to cause a voltage drop along the line; thus, the voltage at the node n1 will depend on the presence or absence of a substance, e.g. a conducting liquid, across the electrodes 2,3.

In the preferred embodiment, the test module comprises an oscillator circuit, in particular of the type adapted to generate at least one alternating signal; this will improve the operating and/or sensing conditions of the device.

For example, proper operation of the electrodes is ensured because they are less subject to electrochemical phenomena when immersed in a conducting liquid, and/or the reading error due to external factors, such as a non-optimal electric contact or connection, is eliminated and/or reduced.

Advantageously then, the test and/or control module 120 is also adapted to generate at least one control signal s3 that controls the output of the sensing circuit, e.g. for the purpose of signalling an operating fault of the circuit. Preferably, the test and/or control module 120 is also adapted to generate a state signal s4 representative of its operating state, so that the other circuit components, e.g. the power module 110, can respond to a possible operating fault of the test and/or control module 120.

For example, the power module 110 may respond by sending a reset signal s1 to the test and/or control module 120 once an operating fault of the module 120 has been detected, in particular as a response to the information carried by said signal s4.

Reference numeral 140 indicates a sensing module for an electronic sensing circuit, in particular of the type adapted to output a sensing signal s5 as a function of the input signal (or logic state) s6 taken from the node n1 and inputted to the module 140.

This input signal s6 varies depending on the presence or absence of a substance interposed between and/or connecting to each other the two electrodes 2 and 3.

In the absence of such a substance, the circuit connected to the electrodes 2,3 will be open, so that s6 will correspond or be equal to the test signal s2. Of course, if elements are interposed between the module 120 and the module 140 which modify the test signal s2, the signal s6 will correspond to the signal that, thus modified, will be found at the node n1.

If, on the contrary, there is a substance across the two electrodes, the impedance (whether resistive, capacitive or inductive) present therebetween will change as a function of the dielectric constant and/or conductivity of that substance, so that the amplitude of s6 will depend on the type of substance interposed between and/or connecting the electrodes.

If the substance is a good electric conductor, such as water filtered by a fuel filter, the electrode 3 may become substantially short-circuited to the ground electrode 2, and therefore the input of the module 140 will be grounded, i.e. it will have a low electric potential.

As a consequence, depending on the presence, and preferably of the type, of a substance across the electrodes 2 and 3, the sensing module will switch or change the value of its output voltage, thereby modifying the information carried by the signal s5.

Reference numeral 180 indicates an output module connected at least to the output of the sensing module 140 and adapted to output at least one output signal s7.

Said signal S7 may be read and used by a suitable external circuit, preferably comprising a microprocessor or a microcontroller (not shown in the drawing), such as the engine control module of a vehicle.

Besides receiving the sensing signal s5, the module 180 also receives the control signal s3 generated by a control module, which in the non-limiting example of FIG. 1 is inside the test and/or control module 120.

Alternatively, the control module may be separate from the test module and be operationally connected to the latter or to another component of the circuit 100 to be monitored.

The control signal s3 controls the output of the output module 180 so that said output module 180 outputs an output signal S7 which, when the sensing device is operating normally, is representative of the presence or absence of a substance across the electrodes.

When the monitored component is faulty (the test module 120 in the example of FIG. 1), the output signal s7 is modified accordingly so as to be representative of a fault in the monitored component.

The output signal S7 is preferably a signal that varies its trend over time (e.g. frequency or duty cycle) and/or its amplitude as a function of the reading taken and/or of any faults detected.

Preferably, if the monitored component is faulty, the output signal s7 is a signal having a constant voltage over time, the voltage value of which is a predetermined value which is interpreted by the signal receiver (e.g. the vehicle's control module) as a fault signal.

Said predetermined value preferably depends on the type of fault detected, as will be further explained hereafter, and in particular is different from the voltage values taken by the sensing signal which carry information about the reading.

The module 180 receives at its input a signal s5 sent by the sensing module 140, and outputs said signal s7, preferably having a frequency and an amplitude chosen appropriately according to the information to be transmitted, e.g. presence or absence of a substance across the electrodes.

In this sense, the module 180 acts as a converter, i.e. a circuit that converts a voltage signal into another one.

The module 180 is also a circuit which adapts and/or combines and/or adds the electric state or voltage of multiple circuits or modules; preferably the module 180 combines the outputs and/or signals s3, s5 of multiple modules 120, 140 in order to supply a single signal S7 representative of multiple states and/or readings.

Figure 2:
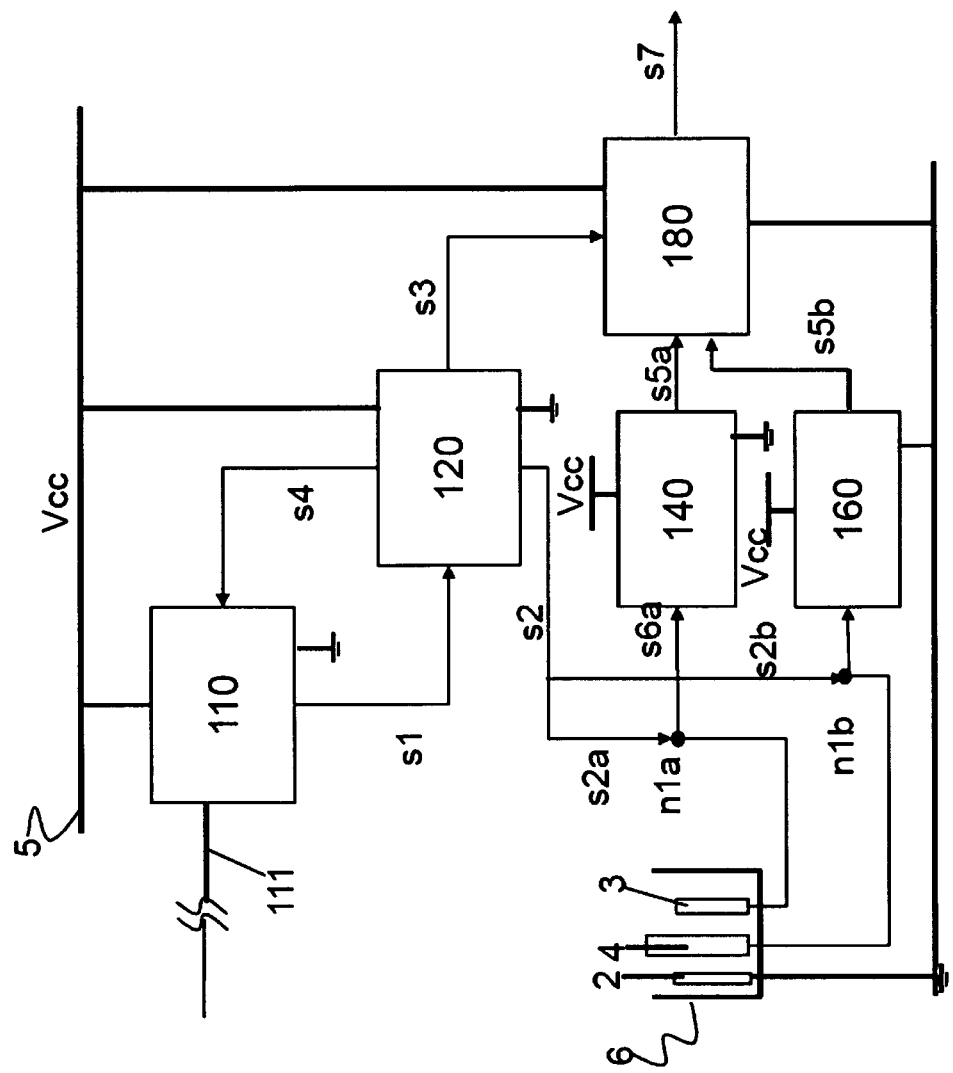
FIG. 2 is a block diagram of a circuit according to a second embodiment of the present invention.

FIG. 2 shows a second embodiment of the invention, which provides detection in at least two distinct positions, in particular corresponding to two levels of a liquid, e.g. a conducting liquid, inside a container.

To avoid repeating what has already been said with reference to FIG. 1, the elements being functionally similar or equivalent to those of FIG. 1 are designated in FIG. 2 by the same numerals as those used in FIG. 1 (or by numerals easily referable thereto).

In the example of FIG. 2, in addition to the electrode pair 2 and 3 placed in a first one of said two positions (e.g. low level), the sensing circuit also comprises a third electrode 4 which allows the substance to be detected in a second position (e.g. high level).

Advantageously, instead of using a second distinct electrode pair to sense the high level of the substance, this two-level detection is attained by using the electrode 2 connected to the ground line also in combination with the electrode 4, thus saving one electrode.

Similarly to the electrode 3, the electrode 4 is connected to an input of a sensing module, designated by reference numeral 160. Said module 160 is of the type adapted to generate an output signal in accordance with the input signal (or logic state), which is variable depending on the presence or absence of the substance, in particular on the level to be detected, in said second position or level.

Preferably, blocks 140 and 160 correspond to two electronic circuits similar to each other, but different sensing blocks may also be used.

In FIG. 2 it can be seen that the test module 120 generates an alternating signal s2 which is split into two signals s2a and s2b and is sent to two respective nodes n1a and n1b, to which the inputs of the sensing modules 140 and 160 as well as the electrodes 3 and 4, respectively, are connected; alternatively, the test module 120 may generate two different signals s2a and s2b.

Each sensing module 140 and 160 generates a corresponding sensing signal s5a and s5b, as previously described with reference to the sensing signal s5 of the example of FIG. 1.

As regards the single sensing modules 140 and 160 of FIG. 2, reference should be made to the above description of the sensing module 140 of FIG. 1.

In order to take into account the two sensing levels, the output module 180 comprises an electronic circuit which, besides operating as a converter, also acts as a combiner and generates an output signal s7, the value of which depends on the combination of the signals s5a and s5b that it receives at its input.

The module 180 is also a circuit which adapts and/or combines and/or adds the electric state or voltage of multiple circuits or modules; preferably the module 180 combines the outputs and/or signals s3, s5a, s5b of multiple modules 120, 140, 160 in order to supply a single signal S7 representative of multiple states and/or readings.

Preferably, the module 180 is a linear combiner such as, by way of non-limiting example, an adder.

Figure 2A:
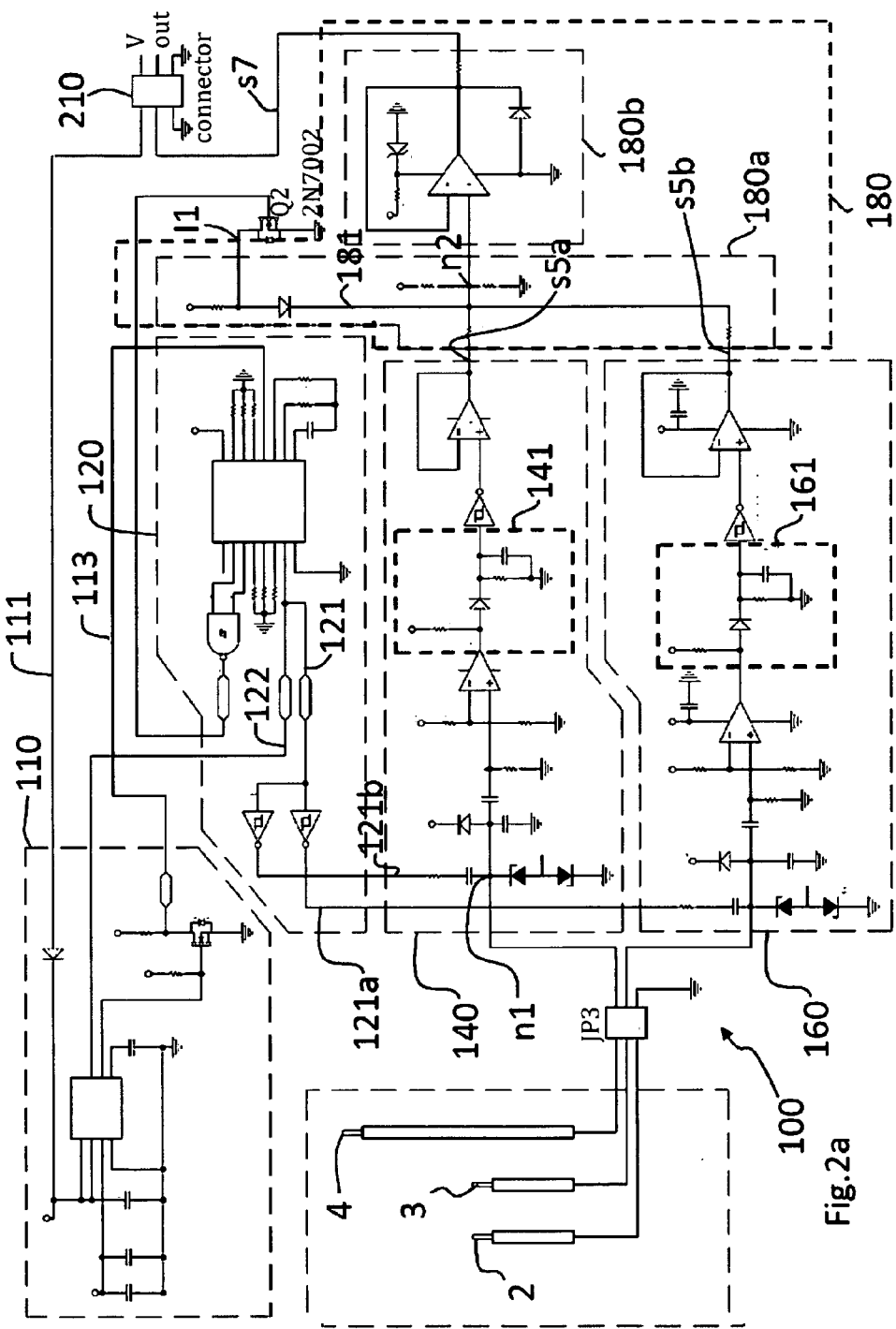
FIG. 2a is a diagram of a sensing circuit that comprises the circuit blocks of FIG. 2.

A sensing circuit corresponding to the example of FIG. 2 is shown in FIG. 2a.

Figure 2B:
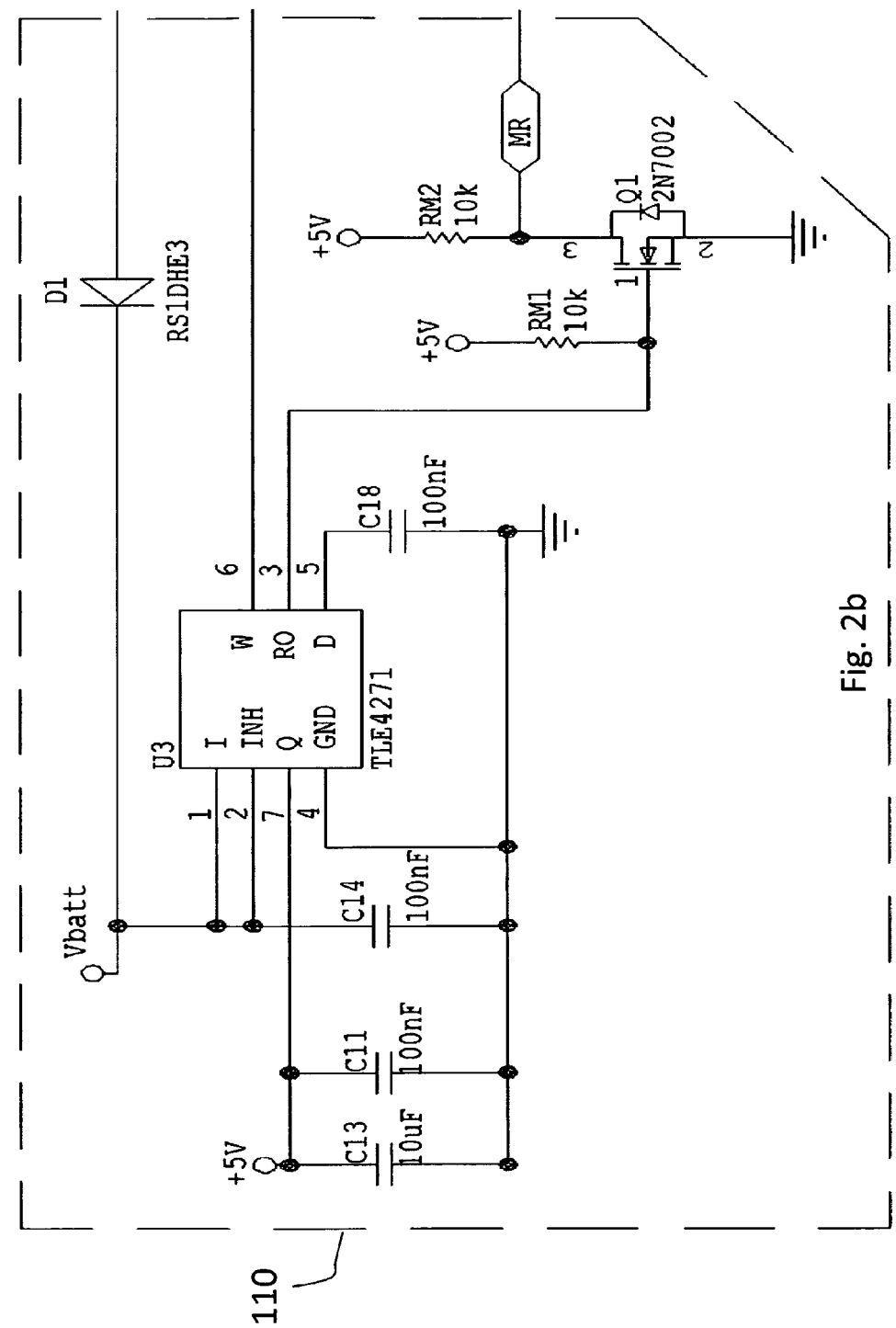
Figure 2C:
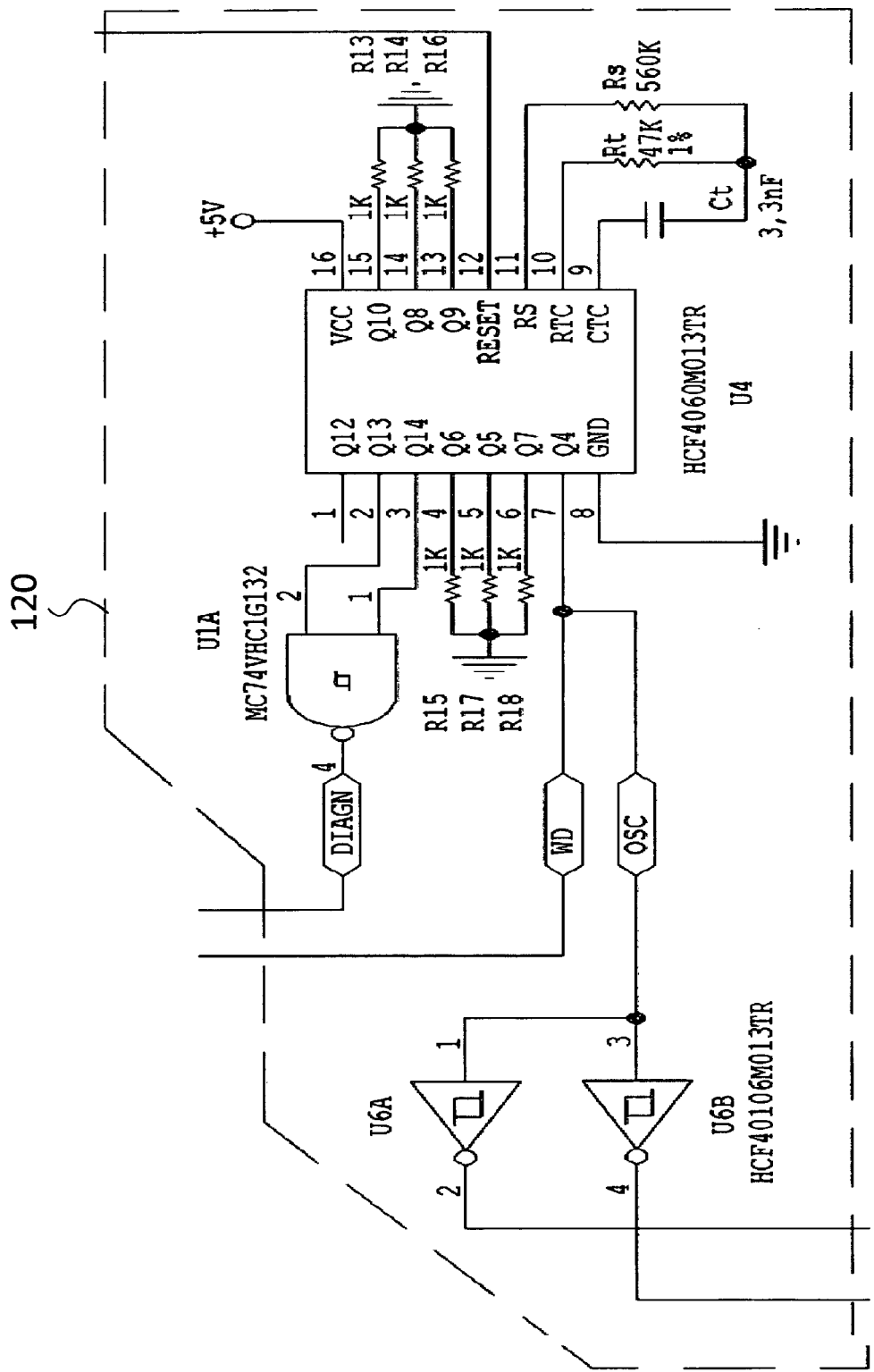
Figure 2D:
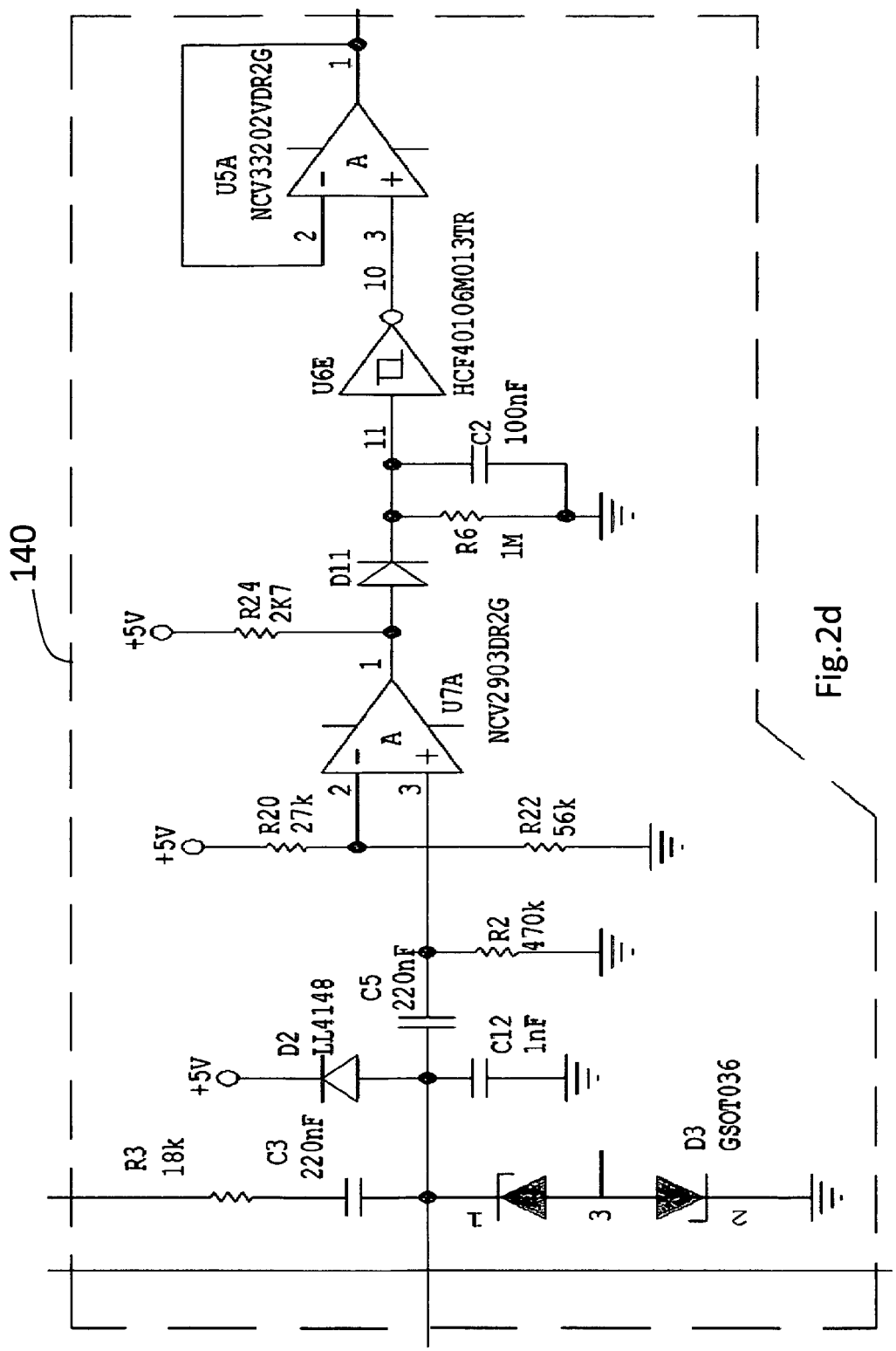
Figure 2E:
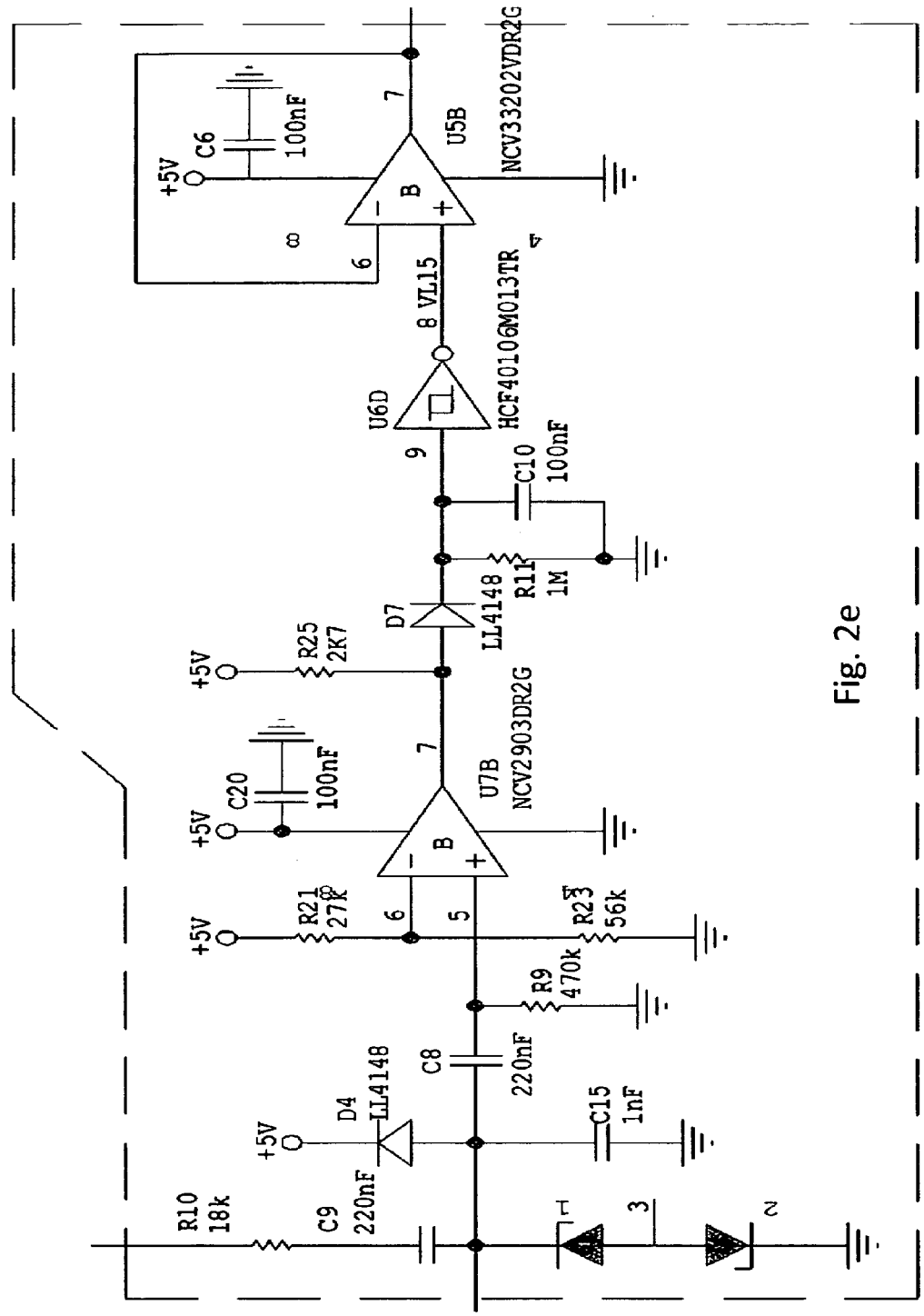
Figure 2F:
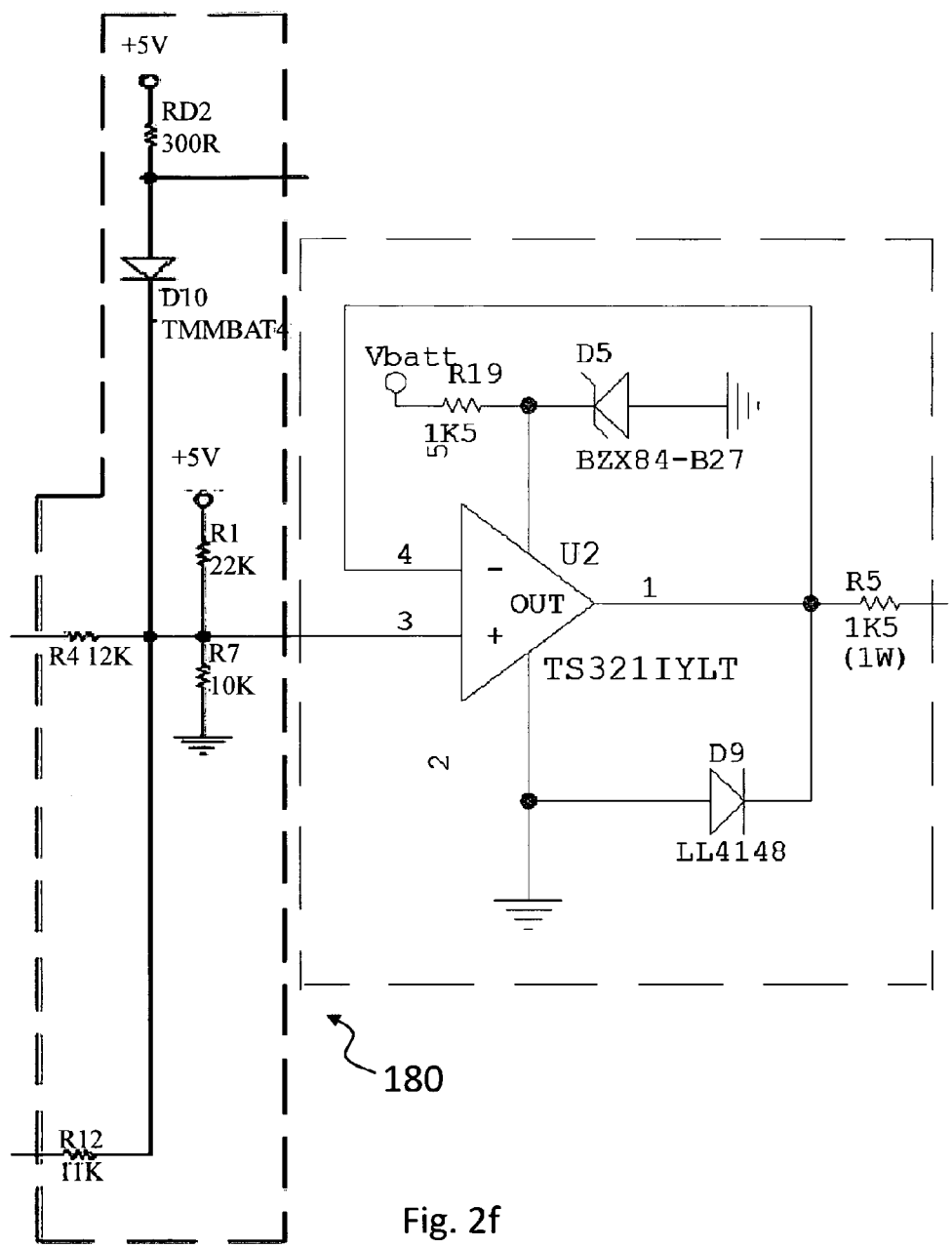

In this example, the module 180 (shown in detail in FIGS. 2f-2g and 2h) comprises a first block 180a (shown in detail in FIGS. $2a^{VI}$) that combines the input signals by means of a resistor network: as the input signals received by the module 180a change, the network of resistors will combine differently, thus causing a variation in the output signal s7.

In the example of FIG. 2a, reference numeral 180b (more visible in FIG. 2h) indicates a block relating to an electronic adapter circuit, in particular used for adapting the electronic circuit of at least one of said other blocks with respect to the output of the electronic circuit 100; preferably, block 180b adapts the impedance or voltage of the electronic circuit 100 with respect to an external circuit, not shown.

Referring to the embodiment example of FIG. 2a, the electric power module 110 of the electronic circuit (shown in detail in FIG. 2b) comprises a reset module adapted to generate at least one control signal, such as the signal MR, adapted to control at least one state of the test module 120, in particular of the oscillator circuit which generates the test signal.

Preferably, the signal MR is a reset signal, in particular of the type adapted to restore at least one initial operating condition of at least one block or one device of the electronic circuit 100.

In a preferred embodiment, the power module 110 preferably comprises a voltage regulator adapted to supply a stable voltage to a power line to which the other modules of the circuit 100 are connected.

In a preferred embodiment, said voltage regulator is obtained by means of an integrated circuit U3, e.g. of the TLE4271 type, which also includes a watchdog input W and a reset output MR, in particular for the purpose of respectively receiving the state signal s4 from the test and control module 120 and to generate the reset signal s1.

The test module 120 (shown in detail in FIG. 2c) comprises an oscillator circuit, e.g. comprising a counter-type integrated circuit, and is in particular adapted to generate at least one alternating signal OSC on the line 121, which preferably is then split, e.g. through a logic-port integrated circuit, into two alternating signals on the lines 121a and 121b, which signals are adapted to energize, respectively, the electrodes 3 and 4 of the level sensor 1 and the respective inputs of the sensing blocks, which will be defined more in detail below.

Preferably, the test and/or control module 120 is also adapted to generate a signal WD on the line 122, which in the example of FIG. 2a coincides with the signal OSC on the line 121.

Said signal WD, which can be defined as watchdog or supervision timer, is representative of the operating state of the oscillator circuit; in fact, when there is no fault WD is a periodic signal having a predetermined frequency, whereas in the event of a fault the signal may lose its initial periodicity and frequency characteristics.

The power module 110 receives the signal WD at the input W and verifies that it goes into the high state within the time defined by an internal counter; should this not happen due to a fault in the oscillator or in any other part of the circuit affecting the oscillator, the module 110, in particular the integrated circuit U3, will generate the reset signal MR, which will be received at the reset input of the integrated circuit U4 that implements the oscillator, thereby restoring the proper operation of the latter.

A reset signal MR may possibly be generated by block 110 even in the presence of different faults, e.g. a low supply voltage level.

According to the invention, the watchdog signal WD, which is typical of microprocessor or microcontroller-based electronic circuits, is generated by a different block or module of the circuit 100, preferably made up of discrete components; for example, in FIG. 2a the signal WD is generated by the test and/or control module 120, in particular by the oscillator, to control the state of other electronic components of the circuit 100, preferably consisting of discrete components as well.

Preferably, the oscillator circuit 120 is also adapted to generate a signal DIAGN, in particular of the type adapted to control a diagnosis state; preferably, the signal DIAGN is adapted to change a state of block 180, in particular of at least one of the input thereof.

The module 120 preferably comprises a counter integrated circuit U4, such as an HCF4060M013TR integrated circuit; in addition, the non-limiting example of FIG. 2a also includes logic integrated circuits U1 and U6, such as at least one NAND port and two inverter ports, e.g. one MC74VHC1G132 integrated circuit and one HCF40106M013TR integrated circuit.

The modules 140 and 160 (shown in detail in FIGS. 2d and 2e) of said sensing circuits preferably comprise operational circuits U5A, U5B, U7A and U7B as, for example, parts of the integrated circuits U5 and U7; preferably, the integrated circuit U5 is of the NCV33202VDR2G type, while the integrated circuit U7 is of the NCV2903DR2G type. The modules 140 and 160 further comprise inverters U6E and U6D as parts of said integrated circuit U6.

The modules 140 and 160 also include a plurality of passive components, some of which are adapted to filter or adapt the input signal, whereas others (like, for example, protection diodes D3 and D6 provided by means of integrated circuits of the GST036 type) are adapted to protect the inputs against anomalous electric noise or voltages which, for example, might enter the circuit through the electrodes 2, 3 e 4.

In the example of FIG. 2a, the module 180 comprises a block 180a followed by the adapter 180b; the voltage value at the output of the module 180 thus substantially corresponds to the voltage value at the output of block 180a, which comprises a plurality of resistors afferent to a node n2.

The different state of the outputs of the sensing and/or control modules of the circuit 100, which may, for example, vary from a null or ground potential to a maximum or positive potential (Vcc), determines different connections of said resistors, such as connections to ground or to positive potential.

Said resistors are therefore connected between the node n2 and the ground or the positive potential Vcc depending on the state of the inputs of the module 180.

According to the state of these inputs, said resistors make up a circuit which is equivalent to a resistive voltage divider consisting of two resistors arranged in series across the positive potential and the ground and connected to each other at the node n2.

By way of example, and with reference to the circuit configuration exemplified in the module 180a of FIG. 2a, the cases described below will be obtained, the equivalent dividers of which are shown schematically in FIGS. 3a-3c.

Of course, any parasitic resistances or alterations of the voltage levels (e.g. not exactly corresponding to the values of ground and VCC), may affect the values of the equivalent resistances.

In these embodiment examples it will be assumed that the high logic state of an input or an output corresponds to a voltage value equal or close to the supply voltage, whereas the low logic state will refer to a situation in which the potential is equal or close to that of the circuit ground.

Figure 3A:
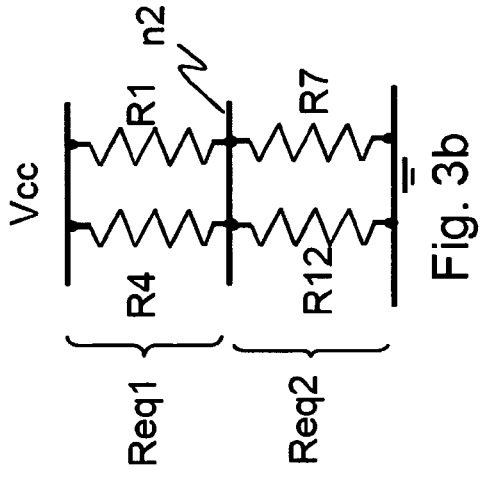

FIG. 3a shows the divider in the case wherein the output of the module 140 is low (equal to ground potential), the output of the module 160 is low (equal to ground potential), and the control input I1 is low (signal DIAGN high).

In these conditions, the module 180a behaves substantially as a divider consisting of two resistors, of which one (Req1) is connected to the positive supply voltage (VCC) and is equal to R1, and one (Req2) is connected to ground and is equal to the parallel of R4, R12 and R7.

Figure 3B:
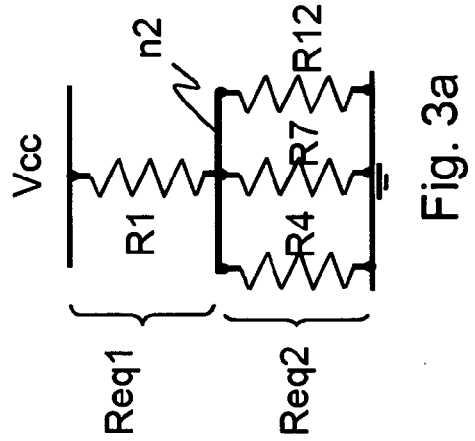

FIG. 3b shows the divider in the case wherein the output of the module 140 is high (equal to supply voltage Vcc), the output of the module 160 is low (equal to ground potential), and the control input I1 is low (signal DIAGN high). In these conditions, the module 180a behaves substantially as a divider consisting of two resistors, of which one (Req1) is connected to the supply voltage and is equal to the parallel of R1 and R4, and one (Req2) is connected to ground and is equal to the parallel of R12 and R7.

Figure 3C:
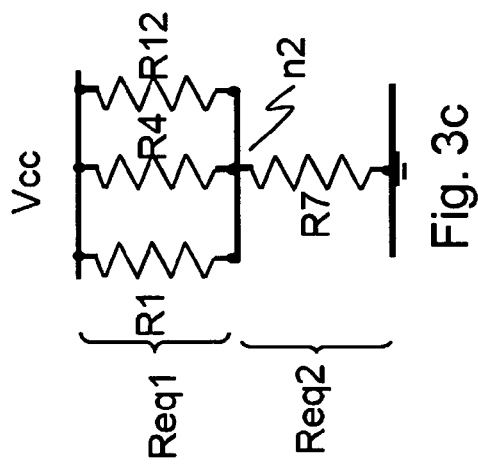

FIG. 3c shows the divider in the case wherein the output of the module 140 is high (equal to supply voltage Vcc), the output of the module 160 is high (equal to supply voltage Vcc), and the control input I1 is low (signal DIAGN high). In these conditions, the module 180a behaves substantially as a divider consisting of two resistors, of which one (Req1) is connected to the supply voltage and is equal to the parallel of R1, R4 and R12, and one (Req2) is connected to ground and is equal to R7.

If the control input I1 is high (signal DIAGN low), then the diode D10, which is afferent to the node n2 through the line 181, becomes conducting and the output of the module 180a is forced high independently of the state of the other inputs; in more detail, in this situation the voltage level at the output of the module 180a will not correspond exactly to the positive supply voltage VCC due to the voltage drop occurring on said diode D10 and/or on a resistor RD2 which, combined with an electronic switch Q2, will determine said state variations in accordance with the control signal DIAGN.

It is therefore apparent from the above description that the variations of the input signals received by the output module 180 will induce a variation of its output voltage, which will take predefined values depending on the state of its inputs. Thus, when the signal DIAGN is high (control input I1 low) the output module 180 will output a sensing signal whose voltage value will depend on the outputs of the modules 140 and 160, i.e. on the presence or absence of a conducting material capable of short-circuiting the electrode pairs 2,3 and 2,4, as will be described more in detail below.

Said module 180a has been exemplified herein by using a configuration prevalently including passive components such as resistors; however, the module 180a may advantageously be provided by using other components such as, for example, operational circuits, e.g. arranged in configurations equivalent to an adder, or by using a circuit with ASIC technology.

The module 180b is an adapter which, in the example of FIG. 2a, is provided by means of an operational circuit, like an integrated circuit U2 of the TS321TYLT type, preferably in the so-called follower and/or inverter configuration or anyway in a configuration suitable for adapting and/or inverting the signal received at its input, which is equivalent to the output signal of block 180, into a signal that can be transferred to the connector 210, which can be connected to an external circuit.

The detection and processing of the different values of said output voltage or signal of the module 180 allow to detect the presence of substances at one or more electrode pairs, and/or to detect any faults in the electronic circuit 100, as will be further explained below.

Analysing more in detail the operation of the exemplificative electronic circuit of FIG. 2a, it can be observed that there is an electric connector 210 having at least three electric terminals, wherein the first terminal is connected to a source of electric voltage (V), such as the positive terminal of the vehicle's battery, whereas a second terminal is connected to the ground or reference potential of the power source, such as the metal structure of the vehicle or a battery terminal.

Preferably, said ground is used as a ground by the whole circuit 100.

The third terminal of the connector 210 provides the output of the circuit 100, which corresponds to the sensing signal or to a fault signal indicating the operating state of the circuit 100.

The third terminal of the connector 210 is therefore connected to the output of the adapter module 200, which refers to said second terminal or ground of the circuit.

Over the electric line or track 111, the supply voltage V is supplied to the input of the module 110, i.e. to the voltage regulator integrated circuit U3, in particular through a diode D1 adapted to prevent any damage due to anomalous polarity reversals.

The regulator circuit U3 of block 110, which may be a TLE4271 integrated circuit, preferably regulates or generates a +5V supply voltage relative to ground, which is adapted to supply power to at least a part of the electronic circuit 100.

The very same integrated circuit U3 integrates a control function called watchdog, i.e. a timed control function, and is therefore adapted to receive, at a respective input W, a timing or control signal generated by at least one block or part of the circuit 100, representative of the operating state of said block or part of the circuit.

In the example of FIG. 2a, the integrated circuit U3 receives the signal WD generated by the module 120 and transmitted by the latter over the electric line or track 122.

In the event of faults in the integrated circuit U4, which can be detected as faults or errors in the signal WD (e.g. changed or no frequency, or no voltage at U4 only), the integrated circuit U3 will bring the output RO low (which is normally kept high by the pull-up resistor RM1) and will switch off the transistor Q1, e.g. of the 2N7002 type, in grounded emitter configuration with a load resistor RM2. Consequently, the output of Q1 (connected to the electric line or track 113) will go high and the reset signal MR will be generated, which will be transmitted to the Reset input of the integrated circuit U7 over the line 113.

The Watchdog (WD) and Reset (RO) signals are correlated with each other, in particular through a capacitor C18 connected to the input D of U3; said capacitor determines a delay time within which an edge of the Watchdog signal (W) must be detected; otherwise, the Reset signal (RO) will be generated, which will then be transformed into said signal MR as previously described.

The signal MR is thus used for controlling the module 120, and in particular for restarting U4, which is a counter provided with its own internal oscillator circuit, the oscillation frequency of which is set by means of a number of external electronic components, such as the capacitor Ct and the resistors Rt and Rs connected to the inputs 9, 10 and 11, respectively, of U4.

At the outputs Q4-Q14, U4 generates signals having half frequency, one-fourth frequency, and so on as the output identification number grows.

At the output Q4, U4 thus generates a signal OSC having a frequency equal to half the oscillation frequency of the oscillator.

Said alternating signal OSC, negated by the inverter circuits of the integrated circuit U6, is then sent to the respective inputs of said sensing blocks 140 and 160, to which also the respective level sensing electrodes 2 and 4 are connected, relative to a reference electrode 2 connected to ground. The presence or absence of the fluid or liquid to be measured across said electrodes, in particular across the electrode pair 2 and 3 and/or the electrode pair 2 and 4, causes a dielectric and/or resistance and/or impedance variation across the electrodes such as to induce a voltage variation at the positive input of the operational circuit U7 of the respective block 140 and 160.

Advantageously, in order to prevent the electrodes from being damaged, at the input of the modules 140 and 160 there are decoupling or filtering components adapted to prevent direct voltages from being generated across the electrodes.

For example, the capacitors C5 and C8 prevent direct voltage signals from arriving at the positive input of the comparator provided by the operational circuit U7, while only allowing alternating voltage signals to pass through. Likewise, the capacitors C3 and C9 stop any direct voltage signals and only allow alternating test signals to be carried over the lines 121a and 121b.

If there is no substance across the electrodes, the latter behave like an open circuit, and the test signal negated by the inverters U6A and U6B arrives at the positive input of the operational circuits U7A and U7B, which are configured as comparators, where the reference voltage with which the test signal is to be compared is supplied to the negative input through a resistance divider, respectively R21 and R23 for block 140 and R20 and R22 for block 160.

In these condition of absence of any substances to be detected, the comparator output will alternately take the values of Vcc and ground.

At the comparator output there is a block which operates substantially as a rectifier, in particular a peak detector; in the module 140, said block is designated by numeral 141 and consists of the resistor R24 connected between the supply VCC and the comparator output, the filter consisting of the capacitor C10 and the resistor R11 connected between the ground and the input of the downstream inverter U6, and the diode D7 which connects the comparator output to the filter C10-R11.

When the comparator output is high, the capacitor C2 is charged; on the contrary, when the comparator output is low, the capacitor is discharged through the resistor R11, the discharge time being longer than the oscillation period of the signal OSC.

Because of this particular sizing of C2 and R6, if there is no substance across the electrodes, then at the input of the inverter U6 there will be a signal having a voltage value greater than the switching threshold thereof.

Likewise, in the module 160 there is an analogous rectifier circuit, or peak detector, 161 consisting of the resistor R25, the diode D7 and the filter R11-C10.

Through the effect of the peak detectors, the inverters U6A and U6B see at their input a signal having a high logic value and keep their output low.

The latter is connected to the input of an operational circuit, respectively U5B and U5A, in follower configuration, i.e. having the output fed back to the inverting input with unity feedback gain.

Therefore, in the absence of a substance across the electrodes, at the output of the modules 140 and 160 there will be a signal having a constant voltage over time, equal to the ground voltage.

In this situation, the resistors of the module 180 will be configured like the divider of FIG. 3a.

The dielectric and/or resistance and/or impedance variation across said electrode pairs determines a variation of the signal found at the input of the operational circuit U7.

In particular, if the detected substance is a good conductor, such as, for example, water in a fuel filter, the electrodes are short-circuited, so that the input of the modules 140 and 160 will be substantially grounded as soon as the substance to be detected reaches a first (minimum) level, where the electrodes 2 and 3 are arranged, and a second (maximum) level, where the electrode 4 is arranged, respectively.

Even though not grounded, the comparator input signal is nonetheless reduced through the effect of the parallel of the resistor R2 (for module 140), R9 (for module 160) with the impedance of the substance present across the respective electrodes.

In this situation, when the reference voltage of the comparators U7A and U7B is set appropriately, these will keep their output constantly low.

A signal having a low logic level will also be obtained at the output of the peak detectors and at the input of the inverters U6E and U6D, so that the outputs of the modules 140 and 160 will be high if there are any liquids across the electrodes 2 and 3 and across the electrodes 2 and 4, respectively. Depending on whether only the output of the module 140 or both outputs of both modules 140 and 160 are high, the module 180 will get into the configurations respectively shown in FIGS. 3b and 3c.

In the absence of control by the integrated circuit U4 through the alternating signal DIAGN on the control input I1 of the module 180, the output of the module 180, and consequently that of the sensing circuit 100, would be time-constant voltage signals, with voltage values substantially set by the above-mentioned voltage dividers shown in FIGS. 3a-3c.

As aforementioned, the module 180 comprises a control input I1 driven by a control module which in the example of FIG. 2 is integrated into or a part of the module 120 and comprises a NAND port, e.g. provided by means of an integrated circuit of the MC74VHC1G132 type, the inputs of which are connected to two outputs Q13 and Q14 of the counter U4.

At the outputs Q13 and Q14 there are, respectively, signals having a frequency equal to $1/256$th (one two-hundred and fifty-sixth) and $1/512$th (one five-hundred and twelfth) of the basic frequency of the internal oscillator of U4.

The signal DIAGN outputted by the NAND port is thus a periodic signal having a frequency equal to that of the lower frequency signal (Q13) and a duty cycle of 75%.

Said signal, in the example of FIG. 2a wherein Ct is a 3.3 nF capacitor, and Rt and Rs are 47KΩ and 560KΩ resistors, respectively, has therefore a period of about 5.84 s±20%, and stays high for 4.38 s±20%; of course, these durations may be changed by adjusting the frequencies generated by the integrated circuit U4 by sizing the components Ct, Rt, Cs appropriately.

The signal DIAGN is applied to the transistor Q2 in grounded emitter configuration with the collector connected to the control input of the module 180, so as to create said electronic switch Q2.

This control input is connected to the node n2 through the diode D10 and to the positive supply VCC through the resistor RD2.

When DIAGN is high, the output of Q2, and therefore the control input I1, is low; D10 will thus be inhibited and at the output of the module 180 there will be the voltage defined by the voltage divider, the configuration of which depends on the state of the inputs of the module 180 connected to the outputs of the sensing circuits 140 and 160, as previously described with reference to FIGS. 3a-3c.

When DIAGN is low, the output of Q2 is high, and the diode D10 and the resistor RD2 will bring the output of the module 180 to a voltage value close to the supply voltage, which in the example of FIG. 2a is approximately 4.5V.

FIG. 4 shows some diagrams which are representative of the output signal of the electronic circuit with different readings, i.e. different levels of the fluid or liquid in contact or not with the electrodes 2,3 and 4.

The examples of FIGS. 4a-4d refer to the example of FIG. 2a, wherein RD2=300Ω, R1=22KΩ, R4=12KΩ, R7=10KΩ, R12=11KΩ.

Figure 4A:
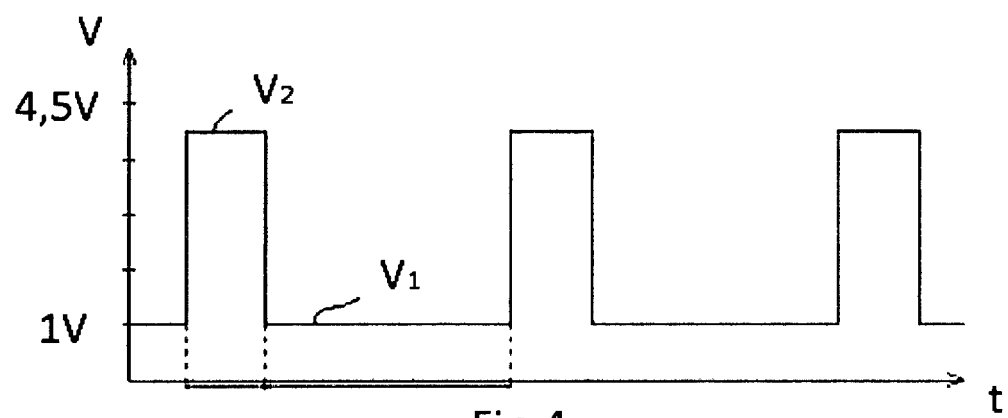

FIG. 4a shows the output signal of the module 180 in the case of total absence of a conducting fluid or liquid across the electrodes 2,3,4 of the sensor 1.

In FIG. 4a, the periodic trend of the output signal has a period of approx. 5.84 seconds (s)±20% and stays low for a time period T2 equal to approx. 4.38 s±20%, whereas it is high and has a value V2 of approx. 4.5 V for a time period T1 equal to approx. 1.46 s±20% (during which DIAGN is low and the control input of the module 180 is high).

The time interval during which the signal stays low can be considered as a reading interval, during which it is possible to detect the presence of a substance across the electrodes.

In the case of absence of a substance across the electrodes, the sizing of the resistors of the module 180 as shown in FIG. 2a produces an output signal having a value of about 1 V.

The time interval of 1.46 s during which the signal stays high allows a microprocessor to recognise, based on the alternation of the voltage levels of the signal, that the sensor is operating correctly.

Figure 4B:
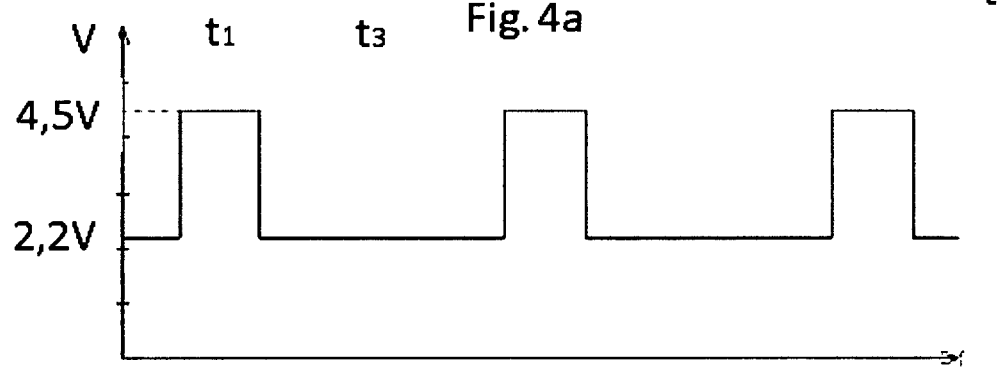

FIG. 4b shows the output signal of the module 180 when there is a fluid or a liquid only across the electrodes 2 and 3 of the sensor 1. In this case, the trend is similar to that of FIG. 4a, but the low logic value of the signal has a value V1 close to approx. 2.2 Volts.

Figure 4C:
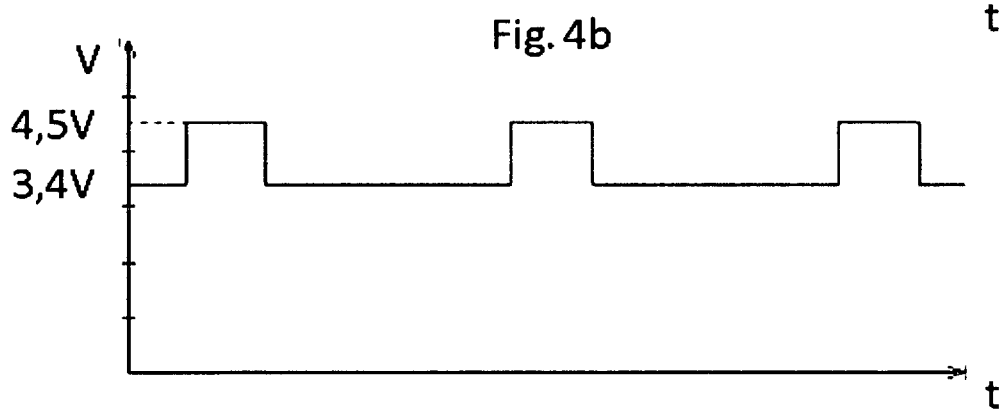

FIG. 4c shows the output signal of the module 180 when there is a fluid or a liquid across the electrodes 2, 3 and 4 of the sensor 1. In this case, the signal takes values V2 equal to approx. 4.5 V and a value V1 of approx. 3.4 V, with a trend similar to that of FIGS. 4a and 4b, imposed by the control signal at the input of the module 180.

Figure 4D:
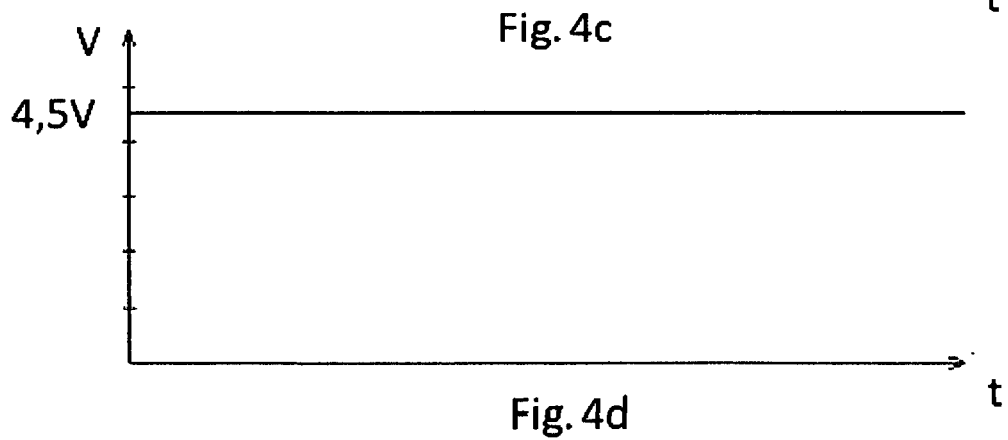

FIG. 4d shows the output signal when the operation of the test module 120 is faulty, in particular in the event of faults in the integrated circuit U4. In this case, the signal DIAGN stays constantly high and Q2 is constantly inhibited, so that the output signal takes a voltage value greater than 4 Volts, preferably greater than 4.5 V.

If there is a fault in the voltage regulator chip U3, the Reset signal MR is high and zeroes all outputs of the counter U4. As a result, the output DIAGN is high, thereby bringing the voltage inputted to the module 180 low (RD2 grounded by Q2).

In such a locked counter condition, also the output OSC is low (the counter output Q4 is low) and then, after being negated by the inverters (U6A-B), it goes high, thus bringing the outputs high, with a direct voltage that is not however allowed to pass through the capacitors. It follows that the positive inputs of the operational circuits U7 of the modules 140 and 160 are low, and therefore the outputs of both modules 140 and 160 are constantly high, with a divider pattern equivalent to that of FIG. 3c and a voltage output stable at approx. 3.4V.

In the event of a power outage (e.g. due to a fault on the line from the battery to the sensor), or if the power module 110 fails, then the supply voltage Vcc will stay set to ground potential (e.g. 0V) and therefore also the sensor output will be zero Volts, i.e. there will be no alternating signal indicating proper operation.

In this embodiment, any direct output signals, regardless of the voltage value, will indicate a faulty state of the sensor which the external control electronics (e.g. a control module of a vehicle) can easily detect and discriminate.

The voltage values and the waveform of the output signal of the device may differ from what is shown in FIGS. 4a-4d or from what has been described for the other faulty conditions, which refer to the circuit of FIG. 2a and to the components shown therein.

Depending on the application, it is possible to size differently the components (e.g. R4, R12, R7 and R1) and the control signals (e.g. the signal DIAGN may be obtained by using different outputs of the counter U4), thus obtaining reading intervals of different length and different voltage values, representative of the readings and/or of faults detected.

Preferably, the output signal s7 has a period between approx. 4 and 8 seconds (s), preferably of approx. 6 s, preferably with a half-period T1 between 1 and 2 s and a half-period T2 between 3 and 6 s.

When there is no substance to be detected across the electrodes, the output signal preferably has a value V1 between 0.5 and 1.5 Volts (V), preferably a value of approx. 1 V, e.g. 1 V±0.5V.

When a substance to be detected is present only across the electrodes 2 and 3 of the sensor 1, the signal preferably takes a value V1 between 1.51 and 2.8 Volts, preferably a value close to approx. 2.2 Volts, e.g. 2.2 V±0.5 V.

When a substance to be detected in present across the electrodes 2, 3 and 4, the signal preferably takes a value V2 of approx. 4.5 V and a value V1 between 2.81 and 3.9 Volts, preferably a value V1 of approx. 3.4 Volts, e.g. 3.4 V±0.5 V.

The presence of a direct signal at the output of the module 180 (whether it is close to supply voltage or to an intermediate voltage or to ground voltage) is interpreted as a fault signal by a microcontroller or microprocessor reading said output signal.

The circuit configuration of FIG. 2a, which preferably utilizes discrete components, may also employ different components, e.g. an ASIV-type electronic component or anyway at least one integrated circuit including circuits or functions at least partly equivalent to those of the discrete components described herein according to the invention.

The control of the output of the circuit 100 may then be attained in a manner different from that shown in the example of 2a; for example, the module 180 may be fitted with an electronic switch adapted to take two positions, wherein in a first position the switch allows the connection between the module 180a and the module 180b, and in a second position it breaks said connection.

In this example, the module 180a may be provided with a pull-up resistor (possibly turned on by the switching of the electronic switch, and consisting of R1 moved from 180a to 180b).

The electronic switch may be driven by the very same control signal DIAGN, so that in the presence of faults the switch will open the connection between 180a and 180b; in this manner, the output of the module 180 will go high independently of the state of the outputs of the modules 140 e 160.

Such an electronic switch may, for example, be provided by means of a relay or, more preferably, a transistor, e.g. a MOSFET, with source and drain connected between the blocks 180a and 180b and with the gate driven by the control signal.

Of course, the electronic circuits described above with reference to FIGS. 1 to 4 may be implemented according to different solutions while still providing the same functions.

For example, the sensing modules 140 and 160 may be implemented as purely capacitive sensors responding to a capacitive variation in the impedance across the electrodes; this solution appears to be suited to the case wherein the substance to be detected is an insulating substance that, when interposed between the electrodes, acts as a capacitor dielectric, the presence of which triggers the sensing circuit.

Likewise, it is apparent that the above-described electronic modules may be separated and mounted on distinct electric units operationally connected to one another, i.e. electrically connected to or anyway capable of exchanging signals with one another.

Referring now to FIGS. 5-7, the sensing circuit and/or device 1 according to the present invention comprises a support plate 50 onto which the electrodes 2,3 and 4 and the three electric terminals 51,52,53 of the above-described electric connector 210 are also secured.

Preferably, for the purpose of reducing the overall dimensions and making the installation process easier, the electrodes 2,3 and 4 and the three electric terminals 51,52,53 are arranged perpendicularly, so that in the assembled condition the electrodes are substantially vertical and the electric terminals are substantially horizontal.

As can be seen in FIG. 7, the body 54 has a bottom cover 50a employed mainly for the purpose of protecting against external agents the circuit 1 housed within a chamber where it must exert its measuring action, said bottom cover 50a being preferably welded, glued or anyway sealingly secured by any other means to the body 54.

In order to simplify the manufacturing process and reduce the costs thereof, at least some parts of the housing or body, e.g. the body 54 and/or the cover 50a, are preferably made of insulating plastic material, e.g. a thermoplastic material: in this case, it is advantageously provided that at least a portion of the plastic body 54 or of the cover 50a is moulded over the electric terminals 51,52,53 so as to form one piece therewith, whereas the electrodes 2, 3 and 4 are subsequently sealingly inserted into the plastic body 54 and welded to the plate 50.

Advantageously, both the electric terminals 51,52,53 and the electrodes 2, 3 and 4 may be moulded over and/or sealingly inserted into said plastic housing or body 54.

As can be easily argued by comparing FIGS. 6 and 7, the electrodes 2, 3 and 4 feature an insulating covering 2A, 3A and 4A extending all around the corresponding electrodes like an insulating sheath, thus leaving exposed only the end portion thereof so as to allow the electrodes 2, 3 and 4 to come into electric contact, at the free end thereof, with the material whose level is to be measured.

In order to obtain a proper seal between the electrodes 2, 3 and 4 and the respective coverings 2A, 3A and 4A and to prevent any infiltration of liquid towards the circuit 1, the electrodes 2, 3 and 4 are fitted with suitable sealing means, such as sealing gaskets preferably consisting of sealing rings, commonly known as "O-rings".

It is advantageously conceivable that each insulating covering 2A, 3A and 4A is made as one piece with the body 54, e.g. by moulding or co-moulding, so as to make the manufacturing process simpler and less costly.

A seal may also be provided between at least one moulded material and said electrodes 2,3,4 and/or said electric terminals 51,52,53, e.g. between the material of said body and/or another moulded element or material, such as a moulded elastomer.

Aiming at insulating the circuit 1 even further, after the electrodes 2, 3 and 4 and/or the electric terminals 51,52,53 have been welded to the plate, the empty space between the plate 50 and the body 54 and/or the cover 50*a* is preferably filled with resin, thus also improving the protection of the circuit 1.

It should also be noted that the body 54 has two housing or mounting seats 57 and 58 extending on two opposite sides of the body itself, which are used for associating the body 54 with the container into which the electrodes 2, 3 and 4 will be placed.

Furthermore, as shown in FIG. 7, a coupling profile 59 is provided around the electric terminals 51,52,53 for securing a corresponding electric connector, such as a plug or a socket; advantageously, the coupling profile 59 is a part of said body or housing 54 and/or has an engagement tooth 80 that prevents an accidental disconnection of the plug or socket associated therewith (not shown in the drawings).

Of course, the body 54, the terminals 51,52,53 and the electrodes 2,3,4 may have shapes other than those shown by way of example in the annexed drawings, or may be made of materials and/or in different ways without departing from the scope and objects of the present invention.

Figure 9:
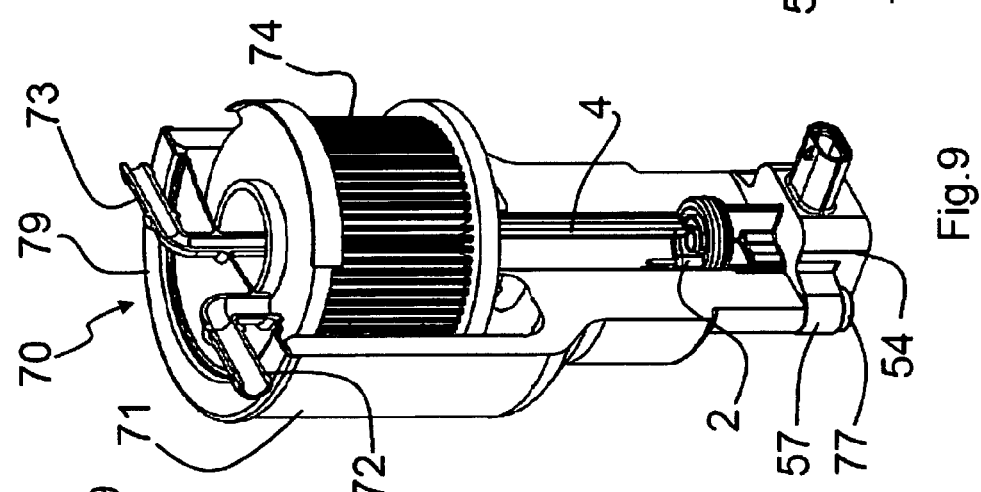
Figure 8:
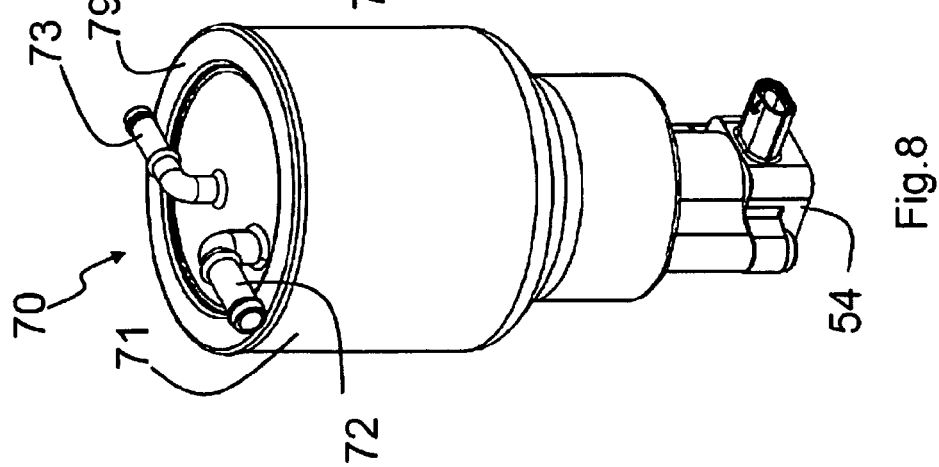

The circuit according to the present invention is preferably mounted onto a level sensor for a filter, such as a fuel filter of the type that will be described below with reference to FIGS. 8 to 10.

The filter 70 typically comprises an outer filter housing 71 fitted with two ducts or sleeves 72 and 73, respectively for fuel inlet and outlet.

Figure 10:
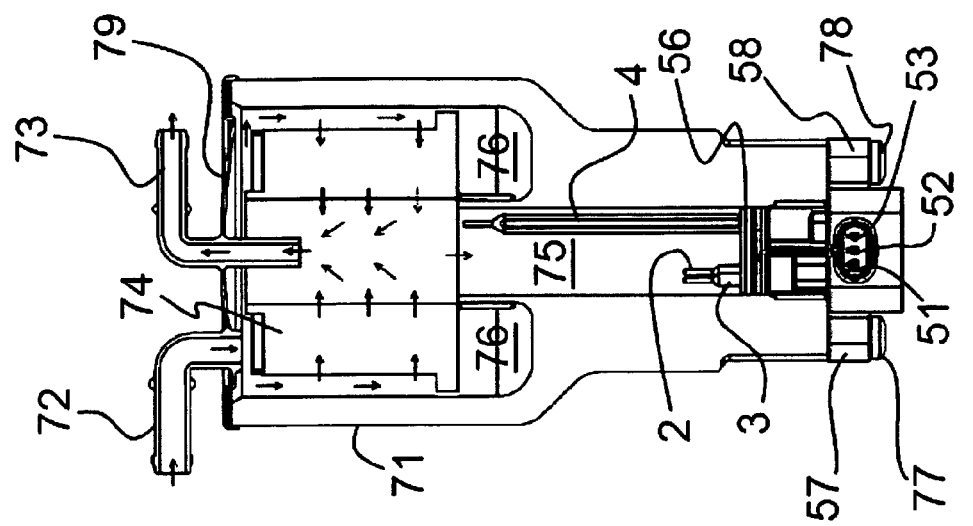
FIGS. 8-10 show the device and/or the circuit of FIGS. 5-7 associated with a filter for vehicles.

Inside the filter housing 71 there is a filtering element 74 so arranged that it is crossed by the fuel flowing from the inlet duct 72 to the outlet duct 73, thus filtering any residual dirt particles: to this end, the fuel flow comes in through the inlet duct 72 in the annular region comprised between the casing 71 and the filtering element 74 (which thus performs its filtering action in a substantially radial direction, or anyway from the outside to the inside), and comes out through the outlet duct 73, located in the hollow central region of the filtering element 74, by following a path that extends at least partly in a substantially radial direction where it crosses the filtering element 74, while flowing in and out in a substantially axial direction, as schematically shown by the arrows in FIG. 10.

In said central region, the filter housing 71 comprises a chamber 75 which houses the device 1 according to the invention and/or is closed at the bottom by the above-described body 54.

In said chamber 75 any water contained in the fuel is collected due to its different density, and its level is measured by the circuit or device 1 by means of the electrodes 2, 3 and 4 as already described.

In operation, in fact, if there is no water the chamber 75 is filled with fuel, which has physical characteristics such as conductivity and/or dielectric, different from water; when on the contrary water is present, it accumulates and its level rises up to the various electrodes 2, 3 and 4, thus being detected by the level sensor according to the invention.

Preferably, when the maximum level is reached the excess water is drained by means of automatic or manual devices not shown, such as a drain duct or hole or the like, possibly fitted with a solenoid valve for controlling the drain.

It should be noted that underneath the filtering element 74, inside the casing 71, a substantially toroidal chamber 76 is obtained which is located under the filtering element 74 and around the region where the chamber 75 is inserted.

In this regard, it must be pointed out that the toroidal chamber 76 is in fluidic communication with the annular chamber around the filtering element 74 and is not in direct communication with the chamber 75 in order to avoid fouling the electrodes 2,3,4.

In certain solutions it is conceivable that the toroidal chamber 76 is put in communication with the space surrounding the filtering element 74, so that a part of any residual dirt particles in the fuel can sediment (because of the slower speed of the fluid flow near the filtering element 74), thus accumulating onto the bottom of the toroidal chamber 76 and being prevented from entering the chamber 75, where it might deposit onto the electrodes 2, 3 and 4 and possibly cause them to malfunction.

Due to the relatively large volume of the toroidal chamber 76 and to the small quantity of residual dirt particles still present in the fuel at that point of the engine fuel system (downstream of the filter usually installed in the vehicle's fuel tank), the toroidal chamber 76 acts as a temporary accumulation container for such dirt particles, and can be cleaned when periodically replacing the filtering element 74.

It should be pointed out that such a solution offers additional advantages: in fact, the fuel filter 70 is preferably made out of just three pieces, i.e. the cover 79, the casing 71 and the body 54 that houses the circuit 1, which is also used as a sealing plug for the chamber 75; this solution offers the unquestionable advantage of allowing the filter 70 to be assembled quickly, while reducing the number of components thereof.

It must be noted that the filter housing 71 may be made as one piece with at least a portion of the body 54, thus advantageously cutting down production costs, for example by manufacturing both parts during the same moulding operation.

In other solutions not shown herein for simplicity's sake, the filter housing 71 may be provided by a part of the engine or its accessories (such as the air filter housing, the battery housing or the like), which may be suitably shaped for this purpose, or by a part of another device of the vehicle.

More in general, the whole device 1, when adapted to carry out measurements other than those described herein, may be provided in such manners just described.

The cover 79 is removably secured to the casing 71, so as to close it at the top on the side opposite to that closed by the body 54, and so as to allow for periodic replacement of the filtering element 74; furthermore, the cover 79 is preferably made as one piece with the inlet and outlet sleeves 72 and 73. It is also worth mentioning, as a variant not shown in the drawings, that the body 54 and the chamber 75 may likewise be integrated with the cover 79, without for this reason departing from the scope of the present invention.

As can be seen in FIGS. 7 and 10, the body 54 features a sealing collar 56 that fits into the chamber 75, thereby closing it at the bottom; in order to improve the seal between these two components, a sealing element is advantageously provided on the edge of the sealing collar 56, such as a rubber gasket, an O-ring or the like.

In order to prevent the body 54 from accidentally disconnecting from the casing 71, thus opening the chamber 75, suitable fastening means are employed, such as two fastening screws 77 and 78, which are inserted into two seats 57 and 58 provided on the body 54 and screwed into the casing 71 itself, thus securing the two parts to each other.

The invention claimed is:

1. A sensing device, comprising:
an electrode pair configured to be positioned within a substance, a voltage being established between the electrodes when a substance establishes contact across said electrode pair, the voltage being dependent on at least a type of the substance;
a sensing circuit connected to said electrode pair and having an output, the sensing circuit being configured to switch the value of the voltage at the output when the substance establishes contact across said electrode pair; and
an output circuit connected to said output of said sensing circuit and configured to provide an output signal on a terminal, the output signal representative of the presence of at least a type of the substance across said electrode pair; and
means for allowing said output signal to take different voltage and/or current and/or frequency values, such that first values which are representative of the presence, level and the at least a type of the substance can be discerned on said terminal and such that second values representative of faults of said device can be discerned on the same terminal.

2. The device according to claim 1, wherein said means for allowing comprises a control module operationally connected to said output circuit and configured to control the output of said output circuit.

3. The device according to claim 1, wherein said means for allowing are configured to set or adjust the output of said output circuit to a predefined voltage value by setting voltage values representative of the presence or level of a substance across the electrodes and/or values representative of faults of said circuit.

4. The device according to claim 1, wherein said different values or said predefined voltage value depend at least partly on the type of fault.

5. The device according to claim 1, further comprising a reset module configured to reset the initial operating condition of at least one component of said device, said reset module being configured to receive a control signal generated by said at least one component of said device and to transmit a reset signal to said at least one component of said device if there is a fault in said control signal.

6. The device according to claim 1, wherein at least one component of said device is a test module configured to provide a test signal across said electrode pair, said test signal being an alternating signal generated by an oscillator.

7. The device according to claim 1, further comprising decoupling means configured to prevent any direct voltages or currents from flowing across, from or towards said electrode pair and said at least one test module and sensing circuit.

8. The device according to claim 1, wherein said output circuit is configured to convert and/or adapt and/or combine and/or add the electric state or voltage of multiple circuits or modules connected to respective inputs of said output circuit, in order to provide a single output signal representative of multiple states of said circuits or modules connected to said inputs.

9. The device according to claim 1, wherein:
said sensing circuit comprises a comparator,
an input of which is connected to said electrode pair and
an output of which is connected to a peak detector configured to output a constant voltage signal having a value close to the peak value of the output of said comparator so that said sensing circuit outputs a constant voltage signal having a voltage value dependent on the presence or absence of a substance establishing contact across said electrodes; and/or
wherein said output circuit comprises:
a voltage divider configured to set a polarization voltage of an output node from which said sensing signal is taken;
a first input branch that connects said output node to said output of said sensing circuit; and
a second input branch that connects said output node to a control input of said output circuit, said control input being driven by said control module so as to lock the potential of said output node to a predefined voltage value; and/or
wherein said device comprises at least one second electrode pair and at least one second sensing circuit, and wherein said output circuit comprises at least one third input branch that connects said output node to an output of a corresponding second sensing circuit, so that the voltage of said output signal has a value dependent on the output signals of the sensing circuits, said electrode pair and said at least one second electrode pair having a common electrode, said common electrode being connected to a ground line of said circuit.

10. The device according to claim 1, wherein said sensing circuit is configured to switch the value of its own output voltage or signal when the substance establishing contact across the two electrodes has an electric conductivity greater than a preset value.

11. The device according to claim 1, comprising at least one of the following:
a body configured to define a chamber for containing a liquid, said electrode pair being arranged within said chamber; and
a filter arranged at the top of a chamber and configured to separate a first liquid from a second liquid, said second liquid having higher specific gravity and/or higher electric conductivity than said first liquid and/or different physical characteristics, and wherein the sensing module of said circuit is preferably configured to switch the value of its own output voltage or signal when said second liquid establishes contact across the two electrodes.

12. A fuel filter for a vehicle, comprising:
a casing having at least one inlet and one outlet for the fuel;
a filtering element;
at least one fuel collection chamber; and
a substance sensing circuit according to claim 1, configured to detect a level of a substance within the filter or within said fuel collection chamber.

13. A sensing device, comprising:
an electrode pair configured to be positioned within a substance, a voltage being established between the electrodes when a substance establishes contact across said electrode pair, the voltage being dependent on at least a type of the substance;

a sensing circuit connected to said electrode pair and having an output, the sensing circuit being configured to switch the value of the voltage at the output when the substance establishes contact across said electrode pair; and an output circuit connected to said output of said sensing circuit and configured to provide an output signal on a terminal, the output signal including first values that are representative of the presence and at least a type of the substance across said electrode pair; and means for allowing said output signal to take different voltage and/or current and/or frequency values, such that the first values and second values, which are representative of faults of said device, can be discerned on the same terminal.

14. The device according to claim 13, wherein said means for allowing comprises a control module operationally connected to said output circuit and configured to control the output of said output circuit.

15. The device according to claim 13, wherein said means for allowing are configured to set or adjust the output of said output circuit to a predefined voltage value by setting voltage values representative of the presence or level of a substance across the electrodes and/or values representative of faults of said circuit.

16. The device according to claim 13, wherein said different values or said predefined voltage value depend at least partly on the type of fault.

17. The device according to claim 13, further comprising a reset module configured to reset the initial operating condition of at least one component of said device, said reset module being configured to receive a control signal generated by said at least one component of said device and to transmit a reset signal to said at least one component of said device if there is a fault in said control signal.

18. The device according to claim 13, wherein at least one component of said device is a test module configured to provide a test signal across said electrode pair, said test signal being an alternating signal generated by an oscillator.

19. The device according to claim 13, further comprising decoupling means for preventing any direct voltages or currents from flowing across, from or towards said electrode pair and said at least one test module and sensing circuit.

20. The device according to claim 13, wherein said output circuit is configured to convert and/or adapt and/or combine and/or add the electric state or voltage of multiple circuits or modules connected to respective inputs of said output circuit, in order to provide a single output signal representative of multiple states of said circuits or modules connected to said inputs.

21. The device according to claim 13, wherein:
said sensing circuit comprises a comparator,
an input of which is connected to said electrode pair, and
an output of which is connected to a peak detector configured to output a constant voltage signal having a value close to the peak value of the output of said comparator so that said sensing circuit outputs a constant voltage signal having a voltage value dependent on the presence or absence of a substance establishing contact across said electrodes; and/or
wherein said output circuit comprises:
a voltage divider configured to set a polarization voltage of an output node from which said sensing signal is taken;
a first input branch that connects said output node to said output of said sensing circuit; and
a second input branch that connects said output node to a control input of said output circuit, said control input being driven by said control module so as to lock the potential of said output node to a predefined voltage value; and/or
wherein said device comprises at least one second electrode pair and at least one second sensing circuit, and wherein said output circuit comprises at least one third input branch that connects said output node to an output of a corresponding second sensing circuit, so that the voltage of said output signal has a value dependent on the output signals of the sensing circuits, said electrode pair and said at least one second electrode pair having a common electrode, said common electrode being connected to a ground line of said circuit.

22. The device according to claim 13, wherein said sensing circuit is configured to switch the value of its own output voltage or signal when the substance establishing contact across the two electrodes has an electric conductivity greater than a preset value.

23. The device according to claim 13, comprising at least one of the following:
a body configured to define a chamber for containing a liquid, said electrode pair being arranged within said chamber; and
a filter arranged at the top of a chamber and configured to separate a first liquid from a second liquid, said second liquid having higher specific gravity and/or higher electric conductivity than said first liquid and/or different physical characteristics, and wherein the sensing module of said circuit is preferably configured to switch the value of its own output voltage or signal when said second liquid establishes contact across the two electrodes.

* * * * *